(12) United States Patent
Kim et al.

(10) Patent No.: US 11,550,365 B2
(45) Date of Patent: Jan. 10, 2023

(54) FOLDABLE ELECTRONIC DEVICE INCLUDING SLIDING STRUCTURE AND METHOD FOR CONTROLLING THE SAME

(71) Applicant: Samsung Electronics Co., Ltd., Gyeonggi-do (KR)

(72) Inventors: Minsoo Kim, Gyeonggi-do (KR); Bongsub Kim, Gyeonggi-do (KR); Taewon Kim, Gyeonggi-do (KR); Sangmin Lee, Gyeonggi-do (KR); Jongheon Lee, Gyeonggi-do (KR); Jiwoo Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 273 days.

(21) Appl. No.: 16/847,794

(22) Filed: Apr. 14, 2020

(65) Prior Publication Data

US 2020/0326754 A1 Oct. 15, 2020

(30) Foreign Application Priority Data

Apr. 15, 2019 (KR) .......................... 10-2019-0043847

(51) Int. Cl.
*G06F 1/16* (2006.01)
*H04N 5/225* (2006.01)
(Continued)

(52) U.S. Cl.
CPC .......... *G06F 1/1652* (2013.01); *G06F 1/1615* (2013.01); *G06F 1/1616* (2013.01);
(Continued)

(58) Field of Classification Search
CPC .... G06F 1/1652; G06F 1/1615; G06F 1/1616; G06F 1/1624; G06F 1/1641;
(Continued)

(56) References Cited

U.S. PATENT DOCUMENTS

| | | | |
|---|---|---|---|
| 7,551,199 B2* | 6/2009 | Bear | H04N 7/144 348/207.1 |
| 9,071,673 B2 | 6/2015 | Choi et al. | |
| 10,917,507 B2* | 2/2021 | Chen | H04M 1/0216 |
| 2005/0049019 A1 | 3/2005 | Lee | |

(Continued)

FOREIGN PATENT DOCUMENTS

| | | | | |
|---|---|---|---|---|
| CN | 208522805 U | * | 2/2019 | H04M 1/02 |
| CN | 208522805 U |   | 2/2019 | |

(Continued)

OTHER PUBLICATIONS

International Search Report dated Jul. 27, 2020.

*Primary Examiner* — Twyler L Haskins
*Assistant Examiner* — Akshay Trehan
(74) *Attorney, Agent, or Firm* — Cha & Reiter, LLC

(57) ABSTRACT

According to an embodiment of the disclosure, an electronic device comprises a first housing structure; and a second housing structure hingedly connected to the first housing structure along a hinge axis, wherein a first surface of the first housing structure faces a first surface of the second housing structure in a folded configuration of the electronic device, and the first surface of the first housing structure and the first surface of the second housing structure are planar in an unfolded configuration of the electronic device; a first display disposed on the first surface of the first housing structure and the first surface of the second housing structure, and bendable about the hinge axis; and a sliding structure retractably disposed in the first housing structure, configured to protrude to the outside of the first housing structure in a direction substantially co-planar to the first surface of the first housing structure, the sliding structure comprising at least one optical input module facing a direction substantially orthogonal to the first surface.

20 Claims, 35 Drawing Sheets

(51) Int. Cl.
*H04M 1/02* (2006.01)
*G09F 9/30* (2006.01)

(52) U.S. Cl.
CPC .......... *G06F 1/1624* (2013.01); *G06F 1/1641* (2013.01); *G06F 1/1647* (2013.01); *G06F 1/1656* (2013.01); *G06F 1/1658* (2013.01); *G06F 1/1681* (2013.01); *G06F 1/1684* (2013.01); *G06F 1/1686* (2013.01); *G09F 9/301* (2013.01); *H04M 1/0214* (2013.01); *H04M 1/0264* (2013.01); *H04M 1/0268* (2013.01); *H04N 5/2252* (2013.01); *H04N 5/2253* (2013.01); *H04N 5/2256* (2013.01); *G06F 2203/04102* (2013.01); *H04M 1/0237* (2013.01); *H04M 2250/16* (2013.01); *H04M 2250/52* (2013.01)

(58) Field of Classification Search
CPC .... G06F 1/1647; G06F 1/1656; G06F 1/1658; G06F 1/1681; G06F 1/1684; G06F 1/1686; G06F 2203/04102; G09F 9/301; H04N 5/2251–2259; H04M 1/0214; H04M 1/0264; H04M 1/0268; H04M 1/0237; H04M 2250/16; H04M 2250/52
See application file for complete search history.

(56) References Cited

U.S. PATENT DOCUMENTS

| | | | |
|---|---|---|---|
| 2013/0182062 A1* | 7/2013 | Son | H04N 7/14 348/14.07 |
| 2014/0104451 A1* | 4/2014 | Todeschini | H04N 5/225 348/222.1 |
| 2014/0285476 A1* | 9/2014 | Cho | H04M 1/0266 345/204 |
| 2015/0222880 A1* | 8/2015 | Choi | G03B 37/04 348/43 |
| 2015/0338888 A1* | 11/2015 | Kim | G06F 1/1643 345/156 |
| 2016/0048363 A1* | 2/2016 | North | G06F 1/1677 345/1.1 |
| 2016/0085325 A1* | 3/2016 | Lee | G06F 1/1641 345/173 |
| 2017/0052566 A1* | 2/2017 | Ka | H04R 3/12 |
| 2017/0318201 A1* | 11/2017 | Evans, V | H04N 5/2252 |
| 2018/0164672 A1 | 6/2018 | Rebot | |
| 2018/0324356 A1* | 11/2018 | Sarraju | H04N 5/23293 |
| 2020/0336578 A1* | 10/2020 | Chen | H04M 1/0216 |

FOREIGN PATENT DOCUMENTS

| | | |
|---|---|---|
| KR | 10-0551426 B1 | 2/2006 |
| KR | 10-0690839 B1 | 3/2007 |
| KR | 10-1839615 B1 | 3/2018 |
| KR | 10-2018-0040968 A | 4/2018 |
| KR | 10-2020-0132972 A | 11/2020 |

* cited by examiner

FOLDABLE ELECTRONIC DEVICE INCLUDING SLIDING STRUCTURE AND METHOD FOR CONTROLLING THE SAME

CROSS-REFERENCE TO RELATED APPLICATION(S)

This application is based on and claims priority under 35 U.S.C. 119 to Korean Patent Application No. 10-2019-0043847, filed on Apr. 15, 2019, in the Korean Intellectual Property Office, the disclosure of which is herein incorporated by reference in its entirety.

BACKGROUND

1) Field

The disclosure relates to a foldable electronic device including a sliding structure.

2) Description of Related Art

Larger screens improve the user experience. At the same time, cameras and other optical input/output devices (infrared sensors, proximity sensors, etc.) are also desirable. However, optical input/output devices consume area on the surface that can otherwise be used for the display.

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, an electronic device comprises a first housing structure; and a second housing structure hingedly connected to the first housing structure along a hinge axis, wherein a first surface of the first housing structure faces a first surface of the second housing structure in a folded configuration of the electronic device, and the first surface of the first housing structure and the first surface of the second housing structure are planar in an unfolded configuration of the electronic device; a first display disposed on the first surface of the first housing structure and the first surface of the second housing structure, and bendable about the hinge axis; and a sliding structure retractably disposed in the first housing structure, configured to protrude to the outside of the first housing structure in a direction substantially co-planar to the first surface of the first housing structure, the sliding structure comprising at least one optical input module facing a direction substantially orthogonal to the first surface.

According to an embodiment of the disclosure, a method for controlling an electronic device comprising a flexible display and a sliding structure having a camera module disposed thereon, comprises executing at least one application; detecting a folding state of the flexible display through at least one sensor; and moving and activating the camera of the sliding structure such that the camera is exposed to the outside of the electronic device in response to the detected folding state and the at least one application.

According to an embodiment of the disclosure an electronic device comprises a foldable housing comprising: a first housing structure comprising a first surface facing a first direction and a second surface facing a second direction that is opposite to the first direction; and a second housing structure hingedly connected to the second housing structure, comprising a third surface facing a third direction and a fourth surface facing a fourth direction that is opposite to the third direction; a first display disposed on the first surface and the third surface; and a structure configured to slide between a space in the second housing structure and the outside of the foldable housing to move between a first periphery of the third surface and a second periphery of the fourth surface, the structure comprising: at least one camera facing at least one of the third direction or the fourth direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

In order to form a full screen of an electronic device, efforts are being undertaken to dispose an optical input/output device such as a camera module under a display to prevent the optical input/output device from being viewed from the outside.

In a flexible display, even though an optical input/output device is disposed on a first display of an electronic device, an optical input/output device may be additionally disposed in a second display opposite the first display. The input/output device can be used for an authentication operation through the second display, for example, as a selfie camera.

A measure for utilizing a first display and a second display disposed in the interior of or outside of the electronic device by using one optical input/output device can be beneficial.

Regardless of an active state of the optical input/output device, the optical input/output device may be designed to be exposed to the outside. When the flexible display is designed as a full display, the optical input/output device should be designed such that a notch is formed at one corner of an deployed housing module or a display of the corresponding area may not be disposed or has to be designed such that the optical input/output device may not be viewed.

When a display is disposed on a first surface and a second surface of the housing, a problem of disposing an optical input/output device separately from the display occurs, and a measure of solving an inefficiency according to repeated disposition of the optical input/output device is desirable.

Certain aspects of this disclosure provide an electronic device that can prevent duplication of an optical input/output device by using a sliding structure, on which an optical input/output device is mounted.

Figure 1:
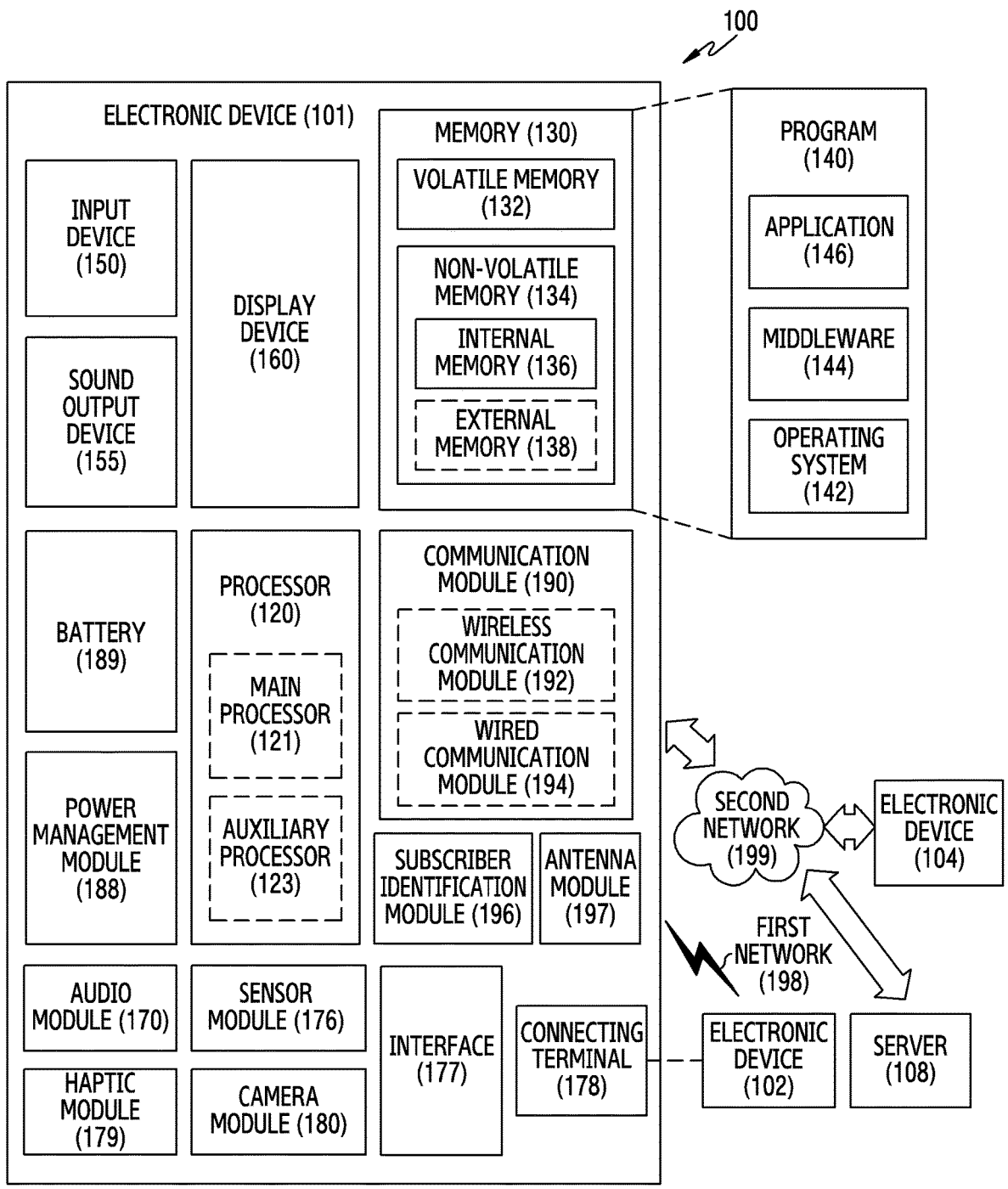
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The term "processor" shall be understood to include both the singular and plural contexts. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to certain embodiments of the present disclosure, the user experience can be improved by providing a foldable display screen on the surfaces of a first housing and a second housing hingedly connected to the first housing. The display area is improved by use of sliding structure that retractably protrudes from one of the first housing or the second housing. In certain embodiments, the retractable structure protrudes in a direction that is co-planar or substantially from the housing the it is disposed in. The sliding structure includes at least one optical input/output device (such as a camera, infrared sensor, proximity detector). When the sliding structure is protruding from the housing, the optical input/output device face a direction that is substantially orthogonal to the display on the surface of the housing.

Figure 2:
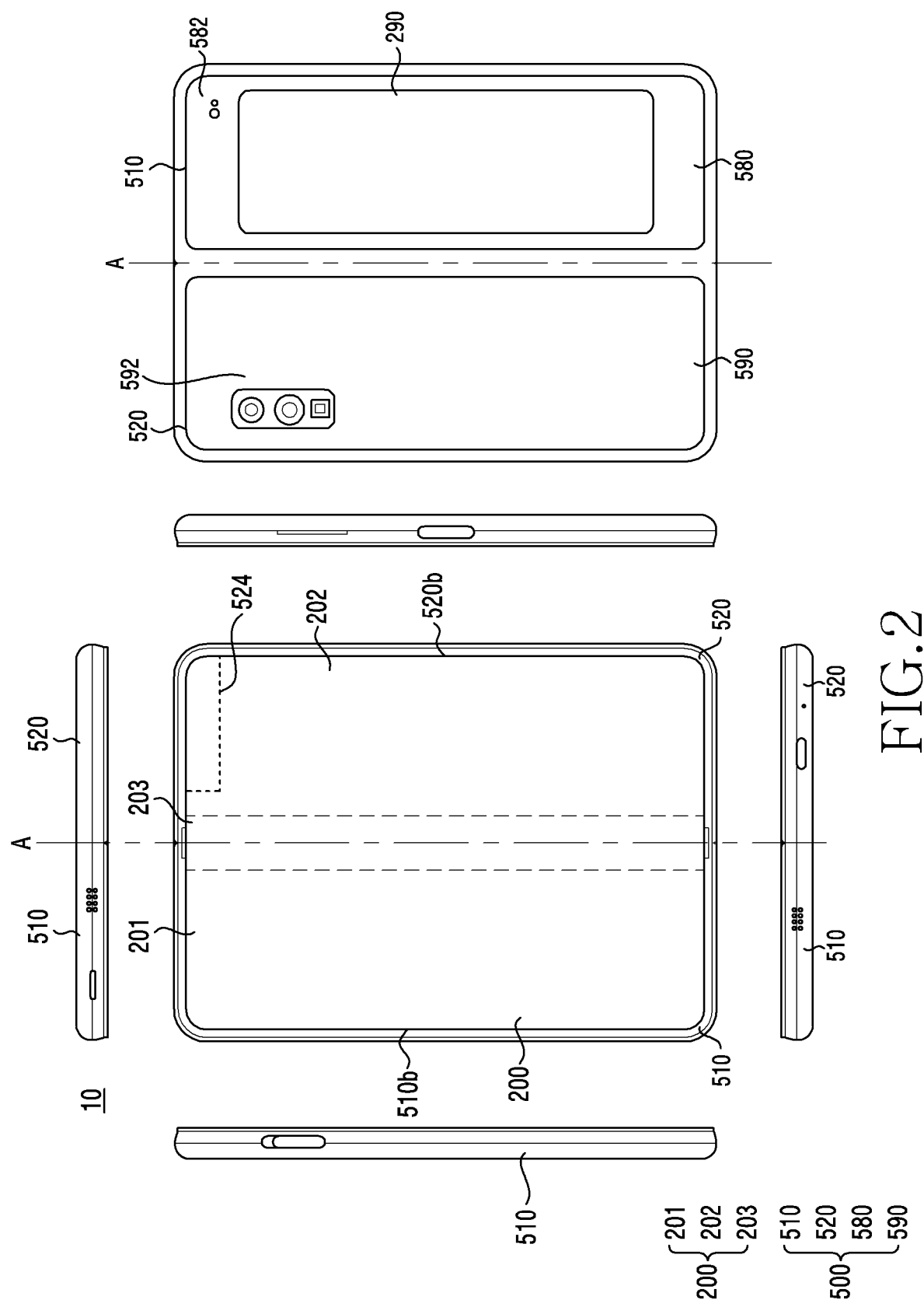
FIG. 2 illustrates a view of a flat state of an electronic device according to an embodiment.
Figure 3:
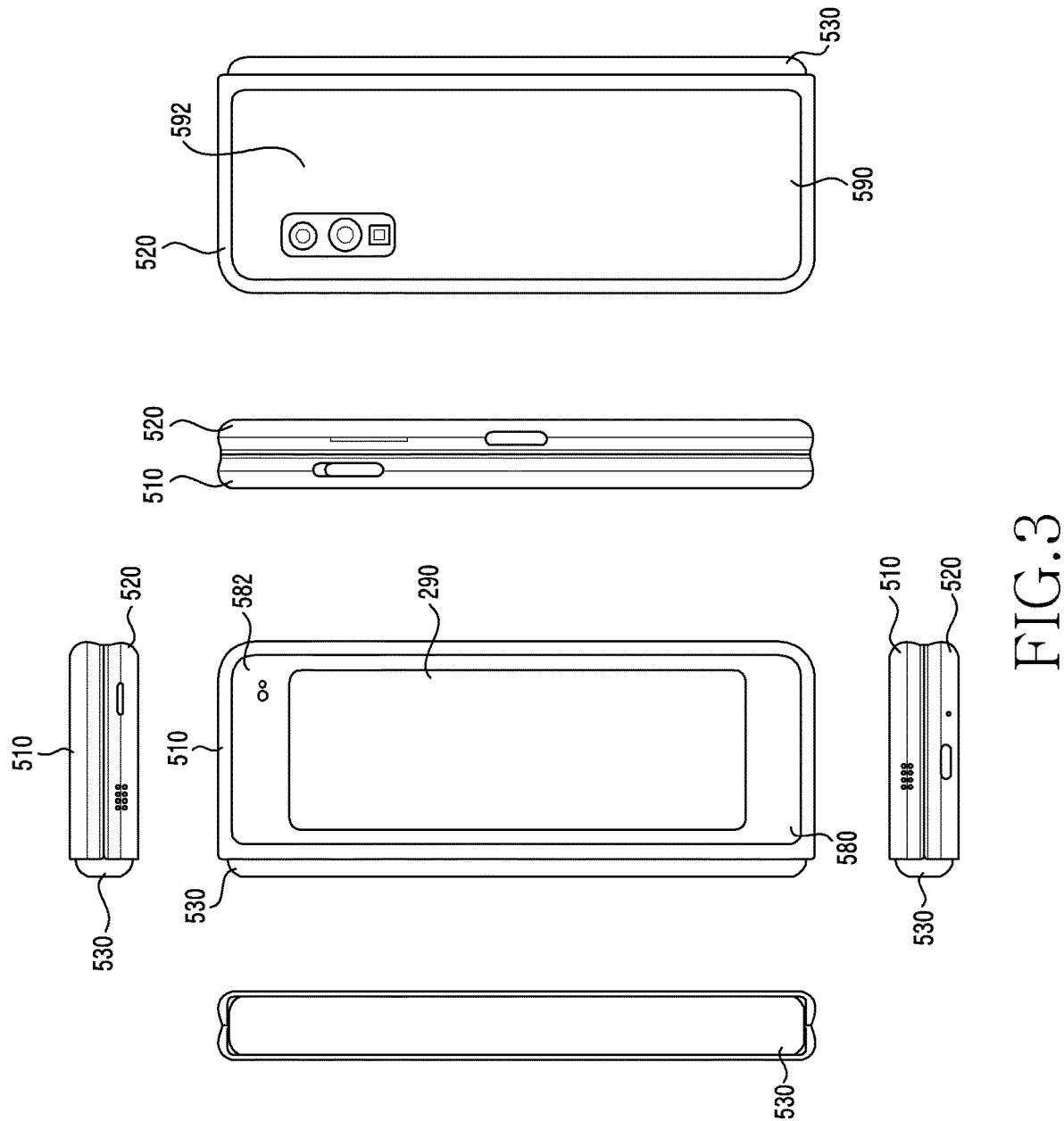
FIG. 3 illustrates a view of a folded state of the electronic device according to an embodiment.

FIG. 2 illustrates a view of a unfolded configuration of the electronic device according and FIG. 3 presents a view of the folded configuration of the electronic device.

Referring to FIGS. 1 and 2, in an embodiment, the electronic device 10 (e.g., electronic device 101 of FIG. 1) may include a foldable housing 500, a hinge cover 530 that covers a foldable portion of the foldable housing 500, and a flexible or foldable display 200 (hereinafter, abbreviated to the "display 200") that is disposed in a space formed by the foldable housing 500. In this disclosure, a surface on which the display 200 is disposed is defined as a first surface or a front surface of the electronic device 10. A surface opposite to the front surface is defined as a second surface or a rear surface of the electronic device 10. A surface that surrounds a space between the front surface and the rear surface is defined as a third surface or a side surface of the electronic device 10.

In an embodiment, the foldable housing 500 may include a first housing structure 510, and a second housing structure 520. The first housing structure 510 and second housing structure 520 can include a sliding area 524, a first back cover 580, and a second back cover 590. The foldable housing 500 of the electronic device 10 is not limited to the form and the coupling illustrated in FIGS. 2 and 3 and may be implemented by a combination and/or a coupling of other shapes or parts. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis or hinge axis (an axis A) and may have substantially symmetrical shapes with respect to the folding axis A. As will be described below, the angle or distance between the first housing structure 510 and the second housing structure 520 may vary depending on whether the electronic device 10 is in a flat, folded, or intermediate state.

In an embodiment, at least a part of the first housing structure 510 and the second housing structure 520 may be formed of metal or non-metal having sufficient strength to support the display 200.

The first housing structure 510 or the second housing structure 520 can have a sliding structure disposed therein, which retractably protrudes to the outside. The sliding structure can include an optical input/output device which is exposed to the outside when the sliding structure protrudes from the housing structure 510, 520. When the sliding structure is retracted, the optical input/output device can be under a sliding area 524.

In an embodiment, a sliding area 524 may be formed to have a predetermined area adjacent to one corner of the second housing structure 520. However, the arrangement, shape, and size of the sliding area 524 are not limited to the illustrated example. The sliding area 524 may be an area in which sensors are mounted inside the housing. The sliding area 524 may be an area in which sensors included in sliding structure described below are deactivated and accommodated. For example, in another embodiment, the sliding area 524 may be provided in another corner of the second housing structure 520 or in any area between an upper corner and a lower corner of the second housing structure 520. In an embodiment, components included in the structure stored in the sliding area 524 to perform various functions embedded in the electronic device 10 may protrude to the outside and be exposed on the front surface of the electronic device 10. In certain embodiments, the components may include various types of sensors. The sensors may include, for example, at least one of a front camera, a receiver, or a proximity sensor.

The first back cover 580 may be disposed on one side of the folding axis A on the rear surface of the electronic device 10 and may have, for example, a substantially rectangular periphery that is surrounded by the first housing structure 510. Similarly, the second back cover 590 may be disposed on an opposite side of the folding axis A on the rear surface of the electronic device 10 and may have a periphery surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have symmetrical shapes, and in another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various components (e.g., a printed circuit board or a battery) of the electronic device 10 are disposed. In an embodiment, one or more components may be disposed or visually exposed on the rear surface of the electronic device 10. For example, at least part of a sub-display 190 may be visually exposed through a first rear area 582 of the first back cover 580. In another embodiment, one or more components or sensors may be visually exposed through a second rear area 592 of the second back cover 590. In certain embodiments, the sensors may include a proximity sensor and/or a rear camera.

The first housing structure 510 and the second housing structure 520 can be hingedly connected to each other, thereby allowing the first housing structure 510 and the second housing structure to rotate about a hinge axis A. In certain embodiments, the first housing structure 510 and the second housing structure can form an angle between 0 and 180 degrees.

Referring to FIG. 3, the hinge cover 530 may be disposed between the first housing structure 510 and the second housing structure 520 to cover internal parts (e.g., hinge structures). In an embodiment, the hinge cover 530 may be hidden by part of the first housing structure 510 and part of the second housing structure 520, or may be exposed to the outside, depending on a state (e.g., a flat state or a folded state) of the electronic device 10.

For example, when the electronic device 10 is in a flat state (unfolded configuration) as illustrated in FIG. 2, the hinge cover 530 may be hidden by the first housing structure 510 and the second housing structure 520 and thus may not be exposed. In another example, when the electronic device 10 is in a folded state (e.g., a fully folded state) as illustrated in FIG. 2, the hinge cover 530 may be exposed between the first housing structure 510 and the second housing structure 520 to the outside. In another example, when the electronic device 10 is in an intermediate state in which the first housing structure 510 and the second housing structure 520 are folded with a certain angle, the hinge cover 530 may be partially exposed between the first housing structure 510 and the second housing structure 520 to the outside. However, in this case, the exposed area may be smaller than that when the electronic device 10 is in a fully folded state. In an embodiment, the hinge cover 530 may include a curved surface.

The display 200 may be disposed in the space formed by the foldable housing 500. For example, the display 200 may be mounted in the recess formed by the foldable housing 500 and may form almost the entire front surface of the electronic device 10.

Accordingly, the front surface of the electronic device 10 may include the display 200, and a partial area of the first housing structure 510 and a partial area of the second housing structure 520 that are adjacent to the display 200. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 200 may refer to a display, at least a partial area of which is able to be transformed into a flat surface or a curved surface. In an embodiment, the display 200 may include a folding area 103, a first area 101 disposed on one side of the folding area 103 (on a left side of the folding area 103 illustrated in FIG. 2), and a second area 102 disposed on an opposite side of the folding area 103 (on a right side of the folding area 103 illustrated in FIG. 2).

The areas of the display 200 illustrated in FIG. 2 are illustrative, and the display 200 may be divided into a plurality of (e.g., four or more, or two) areas according to a structure or function of the display 200. For example, in the embodiment illustrated in FIG. 2, the areas of the display 200 may be divided from each other by the folding area 103 or the folding axis (the axis A) that extends in parallel to the y-axis. However, in another embodiment, the display 200 may be divided into areas with respect to another folding area (e.g., a folding area parallel to the x-axis) or another folding axis (e.g., a folding axis parallel to the x-axis).

The first area 101 and the second area 102 may have substantially symmetrical shapes with respect to the folding area 103. Hereinafter, operations of the first housing structure 510 and the second housing structure 520 and the areas of the display 200 according to states (e.g., a flat state and a folded state) of the electronic device 10 will be described.

In an embodiment, when the electronic device 10 is in a flat state (e.g., FIG. 2), the first housing structure 510 and the second housing structure 520 may be arranged to face the same direction while forming an angle of 180 degrees. The surface of the first area 101 of the display 200 and the surface of the second area 102 thereof may face the same direction (e.g., face away from the front surface of the electronic device 10) while forming an angle of 180 degrees. The folding area 103 may form the same plane together with the first area 101 and the second area 102.

In an embodiment, when the electronic device 10 is in a folded state (e.g., FIG. 3), the first housing structure 510 and the second housing structure 520 may be arranged to face each other. The surface of the first area 101 of the display 200 and the surface of the second area 102 thereof may face each other while forming a narrow angle (e.g., an angle between 0 degrees and 10 degrees). At least part of the folding area 103 may form a curved surface having a predetermined curvature.

In an embodiment, when the electronic device 10 is in an intermediate state (e.g., FIG. 3), the first housing structure 510 and the second housing structure 520 may be arranged to have a certain angle therebetween. The surface of the first area 101 of the display 200 and the surface of the second area 102 thereof may form an angle that is greater than that in the folded state and is smaller than that in the flat state. At least part of the folding area 103 may form a curved surface having a predetermined curvature, and the curvature may be smaller than that in the folded state.

Figure 4:
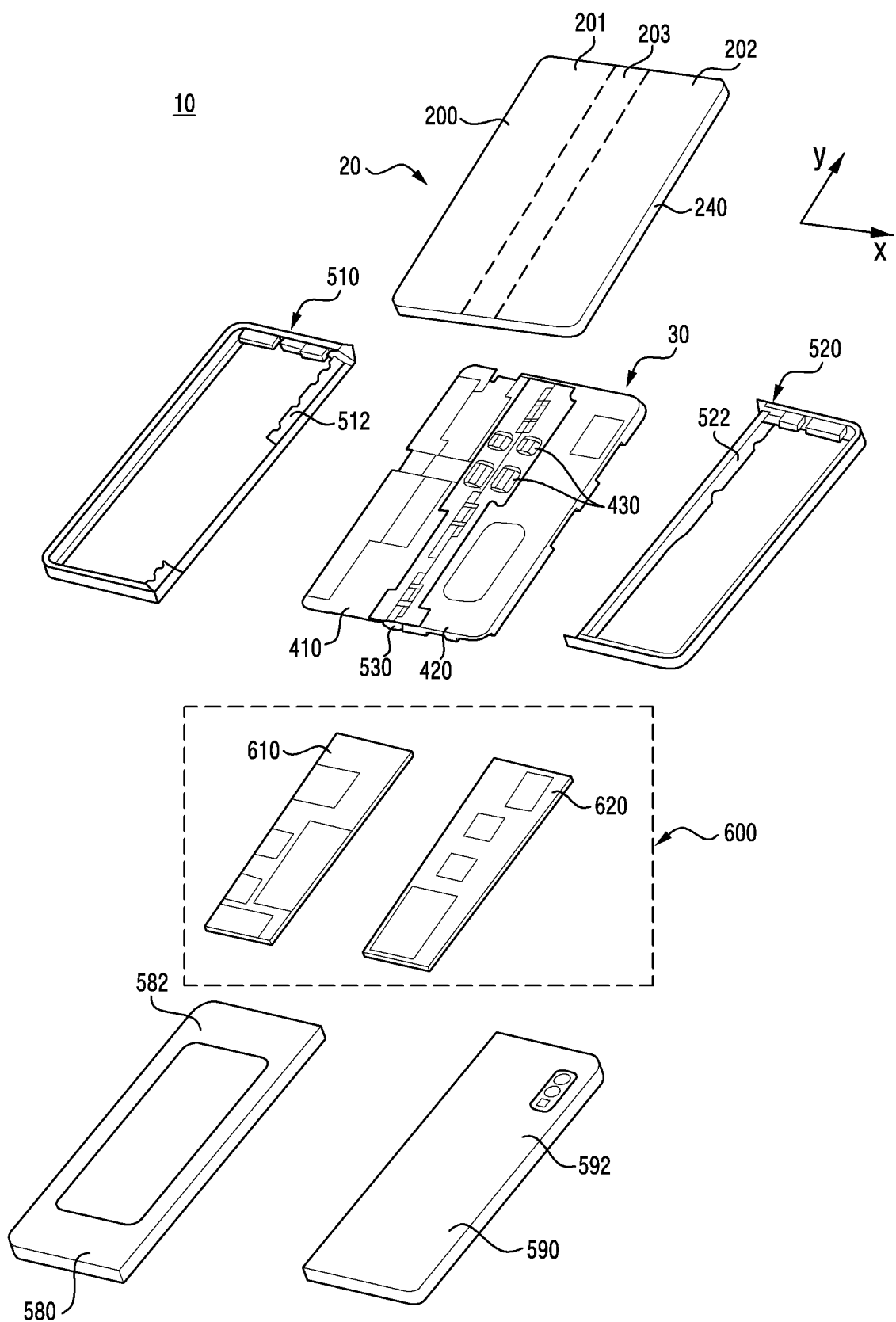
FIG. 4 illustrates an exploded perspective view of the electronic device according to an embodiment.

FIG. 4 illustrates an exploded perspective view of the electronic device according to an embodiment.

Referring to FIG. 4, in an embodiment, the electronic device 10 may include a display unit 20, a bracket assembly 30, a substrate 600, the first housing structure 510, the second housing structure 520, the first back cover 580, and the second back cover 590. In this disclosure, the display unit 20 may be referred to as the display module or the display assembly.

The display unit 20 may include the display 200 and at least one plate or layer 240 on which the display 200 is mounted. In an embodiment, the plate 240 may be disposed between the display 200 and the bracket assembly 30. The display 200 may be disposed on at least part of one surface (e.g., an upper surface with respect to FIG. 4) of the plate 240. The plate 240 may be formed in a shape corresponding to the display 200. The bracket assembly 30 may include a first bracket 410, and a second bracket 420 hingably connected to the first bracket. For example, hinge structures 300 may disposed between the first bracket 410 and the second bracket 420, and hinge cover 530 that covers the hinge structures 300 when viewed from the outside, and a wiring member 430 (e.g., a flexible printed circuit (FPC)) traverses the first bracket 410 and the second bracket 420.

In an embodiment, the bracket assembly 30 may be disposed between the plate 240 and the substrate 600. For example, the first bracket 410 may be disposed between the first area 101 of the display 200 and a first substrate 610. The second bracket 420 may be disposed between the second area 102 of the display 200 and a second substrate 620.

In an embodiment, at least a part of the wiring member 430 and the hinge structures 300 may be disposed inside the bracket assembly 30. The wiring member 430 may be arranged in a direction (e.g., the x-axis direction) across the first bracket 410 and the second bracket 420. The wiring member 430 may be arranged in a direction (e.g., the x-axis direction) that is perpendicular to a folding or hinge axis (e.g., the y-axis or the folding axis A of FIG. 2) of the folding area 103 of the electronic device 10.

As mentioned above, the substrate 600 may include the first substrate 610 disposed at the first bracket 410 side and the second substrate 620 disposed at the second bracket 420 side. The first substrate 610 and the second substrate 620 may be disposed in a space that is formed by the bracket assembly 30, the first housing structure 510, the second housing structure 520, the first back cover 580, and the second back cover 590. Components for implementing various functions of the electronic device 10 may be mounted on the first substrate 610 and the second substrate 620.

The first housing structure 510 and the second housing structure 520 may be assembled so as to be coupled to opposite sides of the bracket assembly 30 in the state in which the display unit 20 is coupled to the bracket assembly 30. As will be described herein, the first housing structure 510 and the second housing structure 520 may slide on the opposite sides of the bracket assembly 30 and may be coupled with the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces that correspond to curved surfaces included in the hinge cover 530.

In an embodiment, when the electronic device 10 is in a flat state (e.g., the electronic device 10 of FIG. 2), the first rotation support surface 512 and the second rotation support surface 522 may cover the hinge cover 530 such that the hinge cover 530 is not exposed, or is exposed to a minimum, on the rear surface of the electronic device 10. Meanwhile, when the electronic device 10 is in a folded state (e.g., the electronic device 10 of FIG. 2), the first rotation support surface 512 and the second rotation support surface 522 may rotate along the curved surfaces included in the hinge cover 530, such that the hinge cover 530 is exposed on the rear surface of the electronic device 10 to the maximum.

In certain embodiments, display unit 20 provides large display, that can be folded. Thus, the electronic device 10 is capable of providing a larger display from a more compact device. That is, when a user wishes to transport or place the electronic device 10 on their person, the electronic device 10 can be folded (folded configuration), thereby consuming a small amount of space. However, when the user wishes to use the electronic device 10, the device can be unfolded (unfolded configuration), thereby allowing the user to enjoy a larger display unit 20.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 5A:
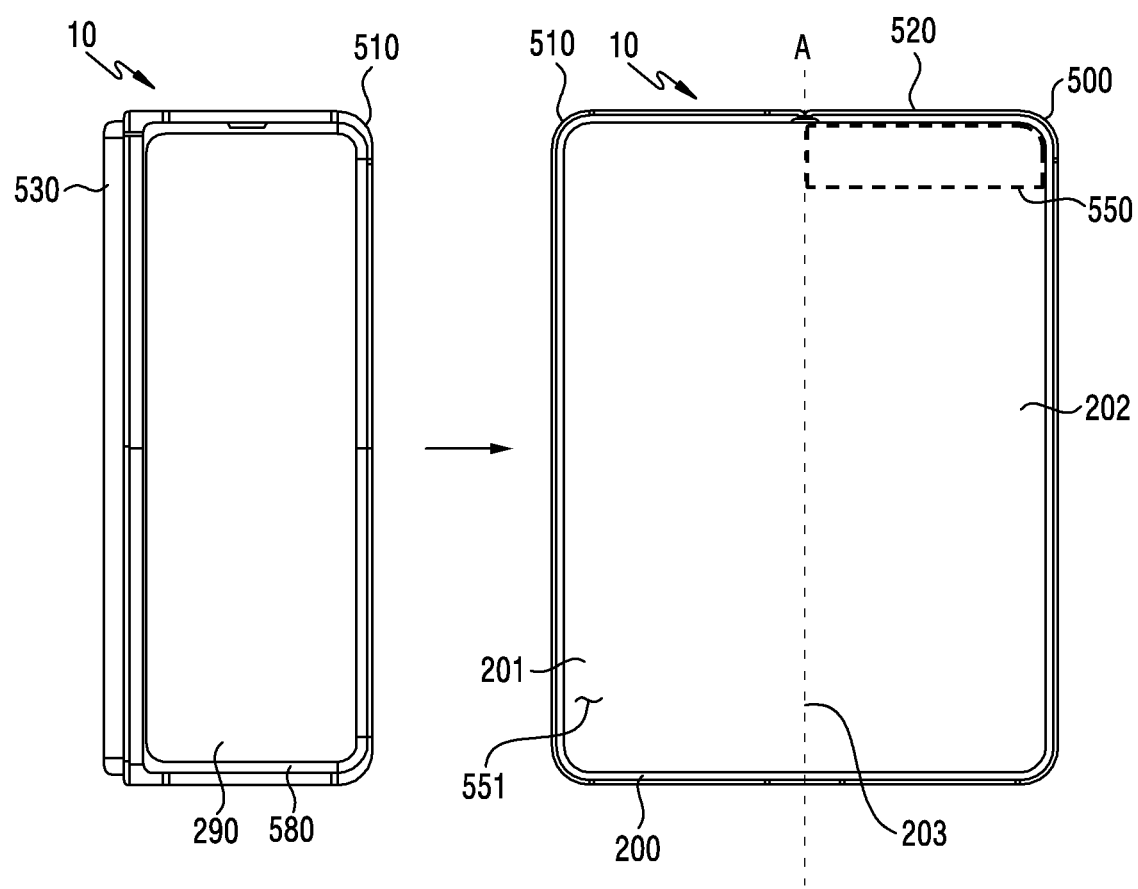
FIG. 5A is a plan view illustrating a folding state and an unfolding state of an electronic device according to certain embodiments.
Figure 5B:
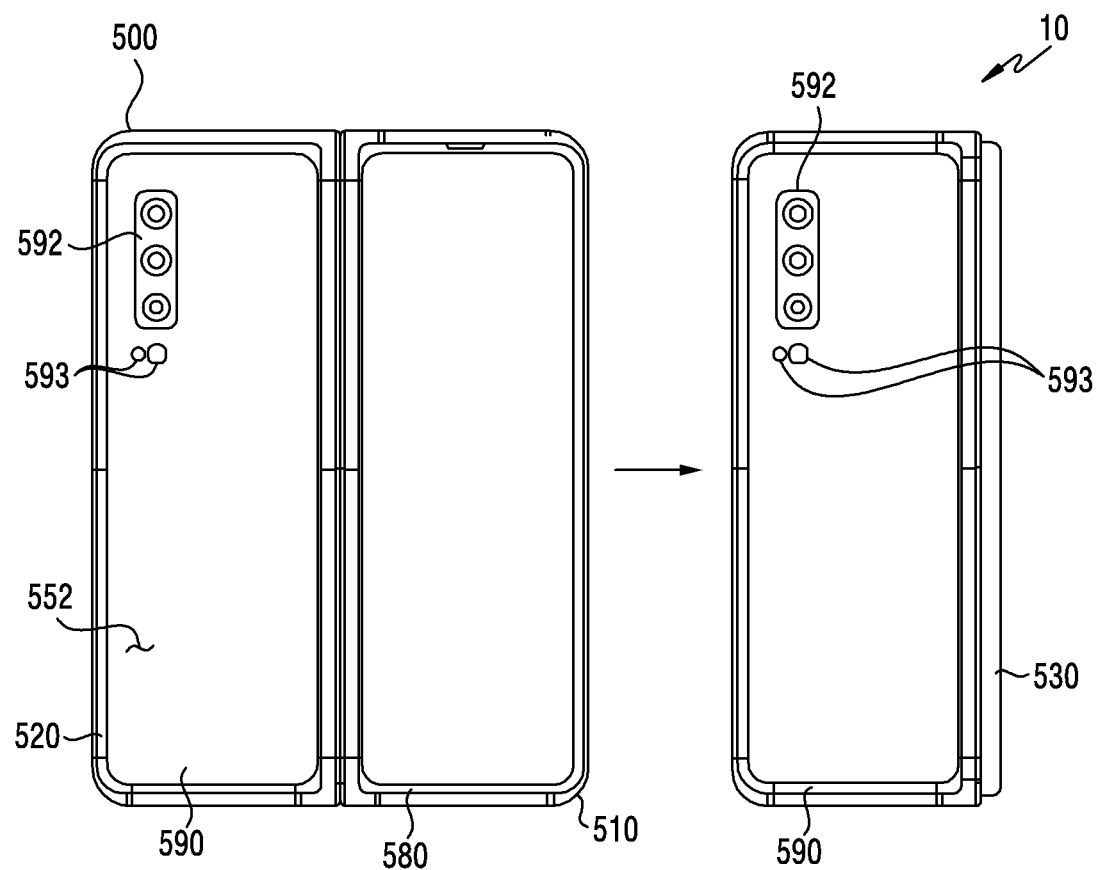
FIG. 5B is a rear view illustrating a folding state and an unfolding state of an electronic device according to certain embodiments.

FIG. 5A is a plan view illustrating a folding state and an unfolding state of an electronic device according to certain embodiments. FIG. 5B is a rear view illustrating a folding state and an unfolding state of an electronic device according to certain embodiments.

Referring to FIGS. 5A and 5B, an electronic device 10 may include a foldable housing 500, a first display 200, and a second display 290.

According to certain embodiments, the foldable housing 500 may include a first surface 551 and a second surface 552 of the electronic device 10, a first housing structure 510, and a second housing structure 520. In a folding state of the electronic device 10, the first surface 551 of the first housing structure 510 and the first surface 551 of the second housing structure 520 may face each other, and in an unfolding state of the electronic device 10, the first surface 551 of the first housing structure 510 and the first surface 551 of the second housing structure 520 may face the same direction. The first housing structure 510 may at least partially surround a space defined by the first surface 551 and the second surface 552. The second housing structure 520 may at least partially surround the remaining parts of the space defined by the first surface 551 and the second surface 552.

According to certain embodiments, the first housing structure 510 and the second housing structure 520 may be connected to a hinge cover 530. A hinge structure (e.g., a hinge structure 535 of FIG. 4) disposed in the hinge cover 530 may convert the state of the foldable housing 500 into a folding (folded configuration) or unfolding state (unfolded configuration). The first housing 510, the second housing structure 520, and a part of the hinge cover 530 may define a side surface that surrounds the space between the first surface and the second surface of the foldable housing 500.

According to certain embodiments, in the folding state of the foldable housing 500, the first surface 551 disposed in the first housing structure 510 may contact the first surface 551 disposed in the second housing structure 520.

According to certain embodiments, the first display 200 may be disposed on the first surface 551, and may be present over the first housing structure 510 and the second housing structure 520, and may be bent about a folding axis A of the hinge cover 530. The first display 200 may include a first area 201 disposed in the first housing structure, a second area 202 disposed in the second housing structure, and a folding area 203. In the folding state of the foldable housing 500, the first area 201 disposed in the first housing structure 510 may contact the second area 202 disposed in the second housing structure 520 in the folding state.

According to certain embodiments, the first display 200 may be disposed to occupy most of the first surface 551 of the first housing structure 510 and the second housing structure 520. The camera module in a sensor area 550, in which an optical input/output device, such as a camera or a proximity sensor, is disposed, may be mounted in the interior of the foldable housing 500 as described below, and may be exposed to the outside of the foldable housing 500 only when the camera module is active.

According to certain embodiments, the second display 290 may be disposed on the second surface 552 of the first housing structure 510 or a first rear cover 580 of the first housing structure 510. The second display 290 may be disposed as a full screen on the second surface 552 of the first housing structure 510. When an optical input/output device is used in the folding state, the optical input/output device may be exposed to a direction that is the same as the direction which the second display 290 of the electronic device 10 faces. For example, in the folding state, the first rear cover 580 of the first housing structure 510 may face a direction that is the same as the direction of the first surface 551 of the second housing structure 520. In the unfolding state, the optical input/output device that protrudes from the interior of the second housing structure 520 to the outside and is exposed may be exposed to a direction that is the same as the direction in which the first display 200 is disposed. In the folding state, the optical input/output device located in the second housing structure 520 may be exposed to the direction in which the second display 290 is disposed.

According to certain embodiments, in the electronic device 10, optical input/output devices 592 and 593 may be disposed on the second surface 552 of the foldable housing 500. The second display 290 may be disposed in the first housing structure 510. According to the electronic device 10, a preview of an image may be identified through the optical input/output devices 592 and 593 by utilizing the second display 290.

Figure 6A:
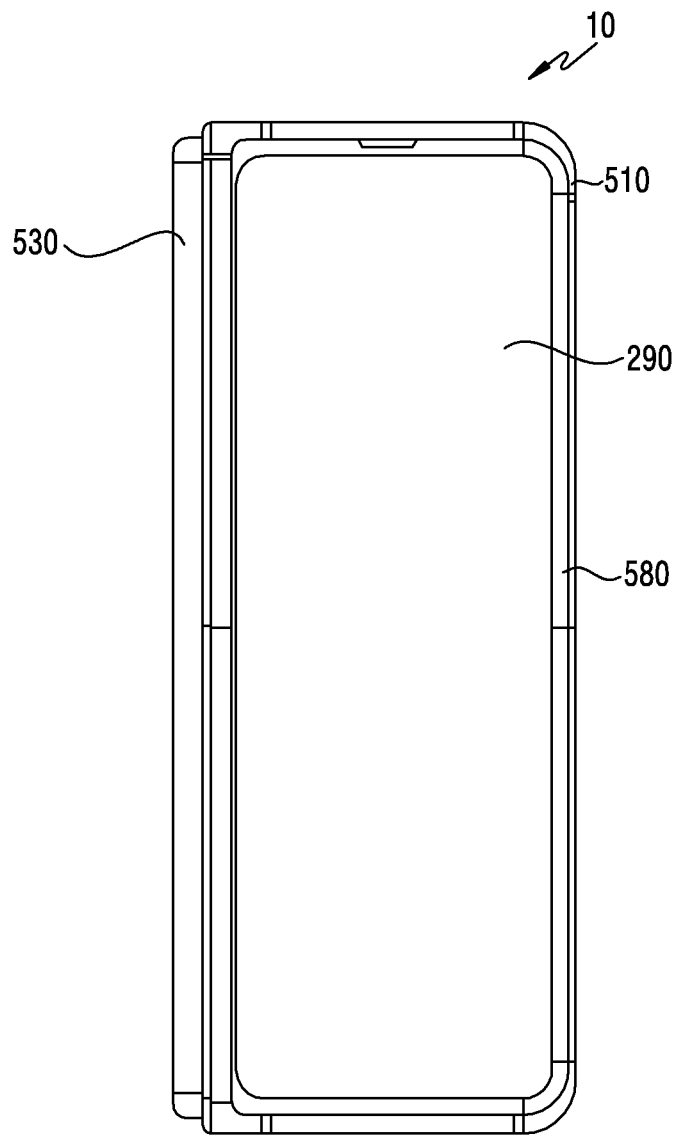
FIG. 6A is a view illustrating an operation of, a sliding structure, getting exposed to the outside of an electronic device in a folding state of an electronic device according to an embodiment.
Figure 6B:
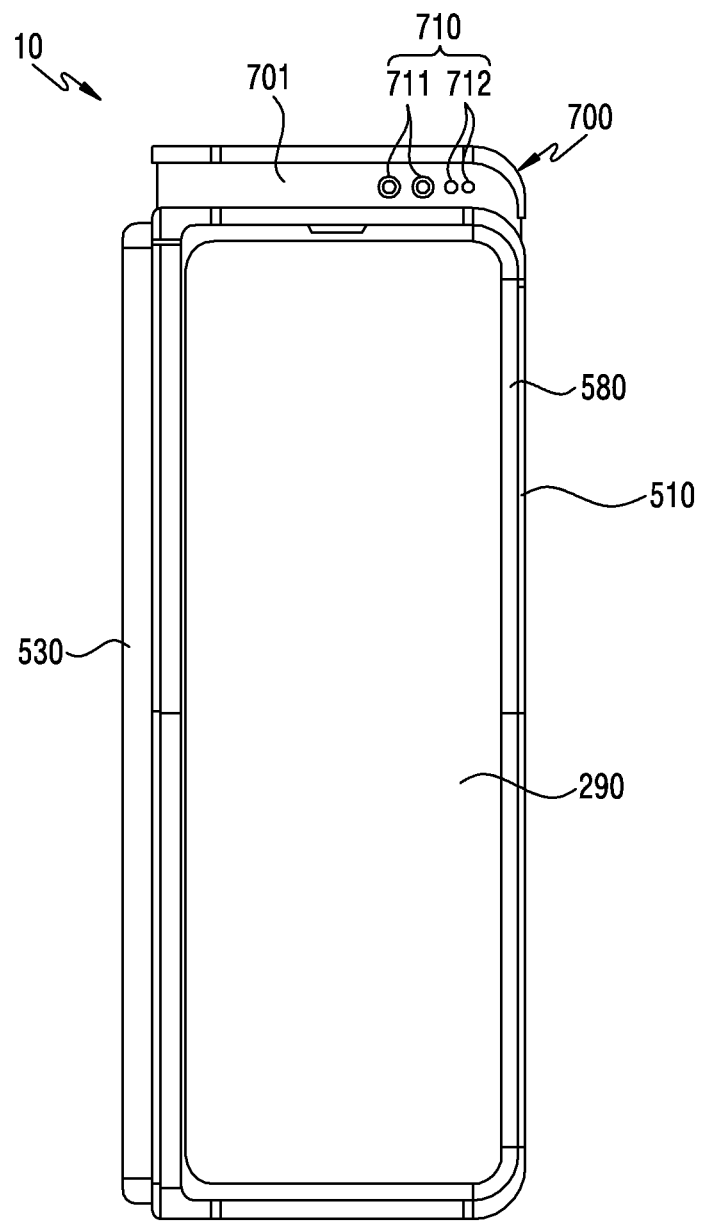
FIG. 6B is a view illustrating an operation of, a sliding structure, getting exposed to the outside of an electronic device in a folding state of an electronic device according to an embodiment.
Figure 7:
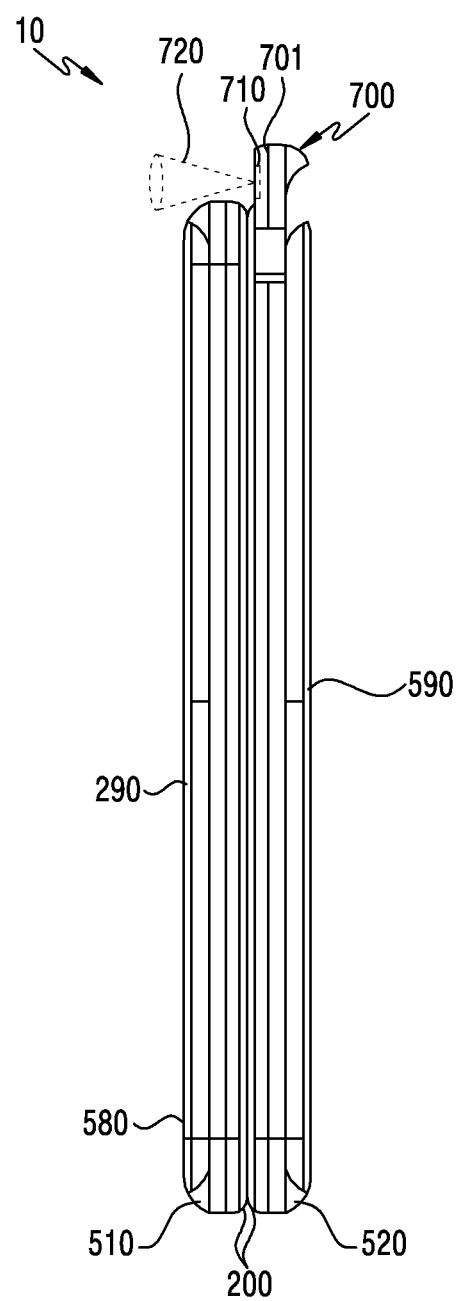
FIG. 7 is a view illustrating a side surface of the electronic device of FIG. 6B.

FIG. 6A is a view illustrating an operation of, a sliding structure, retracted in an electronic device in a folding state of an electronic device according to certain embodiments, and FIG. 6B is a view illustrating an operation of, a sliding structure, getting exposed to the outside of an electronic device in a folding state of an electronic device according to certain embodiments. FIG. 7 is a view illustrating a side surface of the electronic device of FIG. 6B.

Referring to FIGS. 6A and 6B, the electronic device 10 may be in a folding state, and the second display 290 may be disposed on the second surface 552 of the first housing structure 510. A sliding structure 700 that has been kept in the interior of the second housing structure 520 may protrude to the outside.

According to certain embodiments, the sliding structure 700 is disposed in the interior of the second housing structure 520, and may be exposed to the outside to be utilized if necessary, for example, during photographing of a camera. The sliding structure 700 may include a first optical input/output device 710 and a sliding member 701. The first optical input/output device 710 may be disposed through one surface of the sliding member 701, and in the folding state of the electronic device 10, the first optical input/output device 710 may face a direction that is the same as the direction which the second display 290 faces. The first optical input/output device 710 may include at least one camera 711 or at least one sensor 712. The camera 711 may include at least one of a general camera, a bokeh camera, or a 3D recognition camera. The at least one sensor 712 may include at least one of an infrared ray sensor, an illumination sensor, or a proximity sensor. According to the electronic device, a preview of an image may be identified through the first optical input/output devices 710 by utilizing the second display 290. The second display 290 may be a screen, on which a preview of a selfie is displayed.

Referring to FIG. 7, the sliding structure 700 may protrude from the second housing structure 520. The first optical input/output device 710 of the protruding sliding structure 700 may be disposed to face the direction, to which the second display 290 disposed in the first housing structure 510 is exposed. The first optical input/output device 710 may accommodate light corresponding to an angle 720 of view of photographing that is progressed by a lens.

According to certain embodiments, the sliding structure 700 including the first optical input/output device 710 may sufficiently protrude such that the second housing structure 520 does not interfere with the angle 720 of view of photographing.

When the foldable housing 500 is unfolded, the first optical input/output device 710 of the sliding structure 700 protruding from the second housing structure 520 may be disposed to face the direction, to which the first display 200 is exposed.

Figure 8:
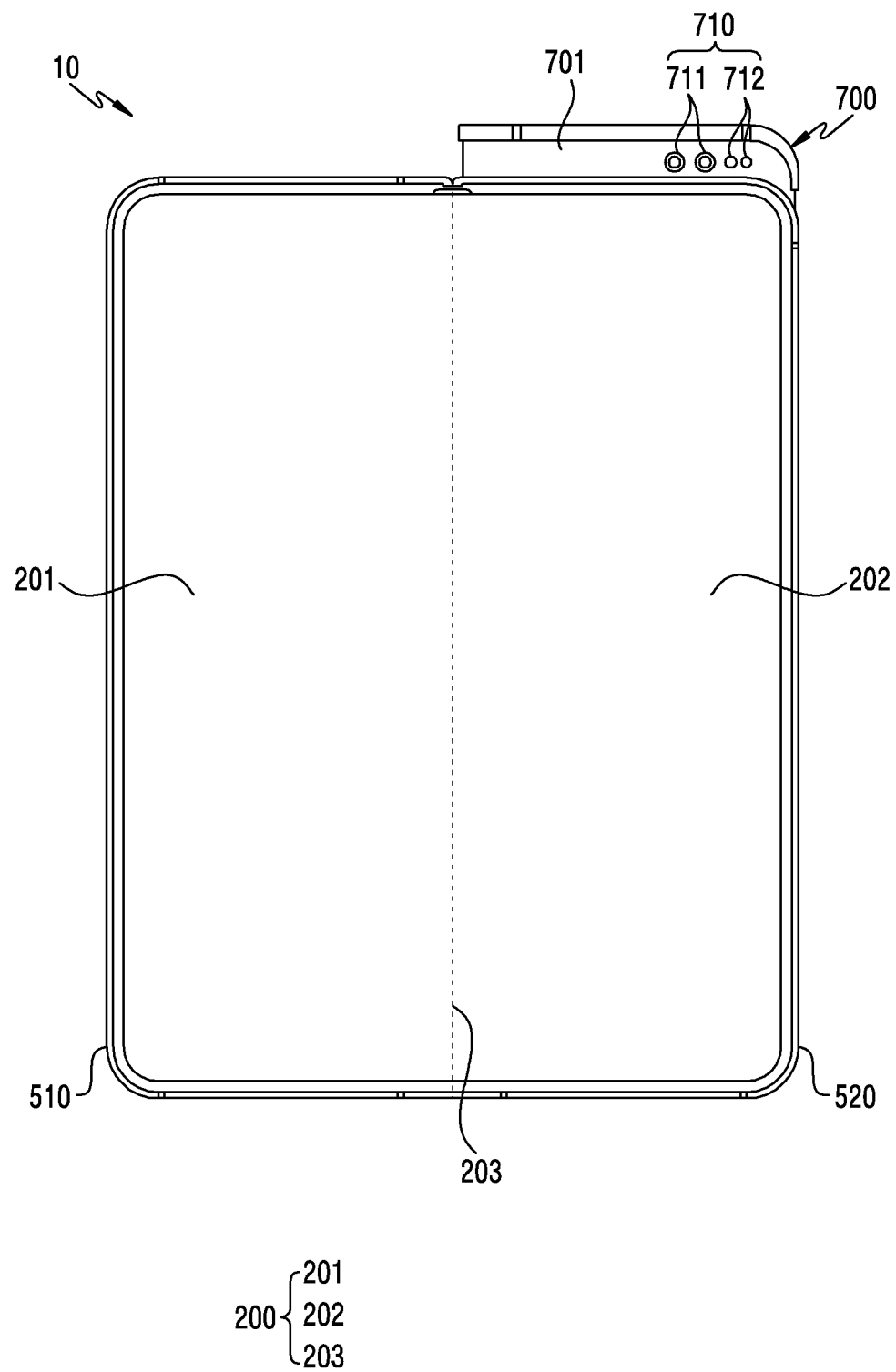
FIG. 8 is a view illustrating an unfolding state of an electronic device according to certain embodiments.
Figure 9:
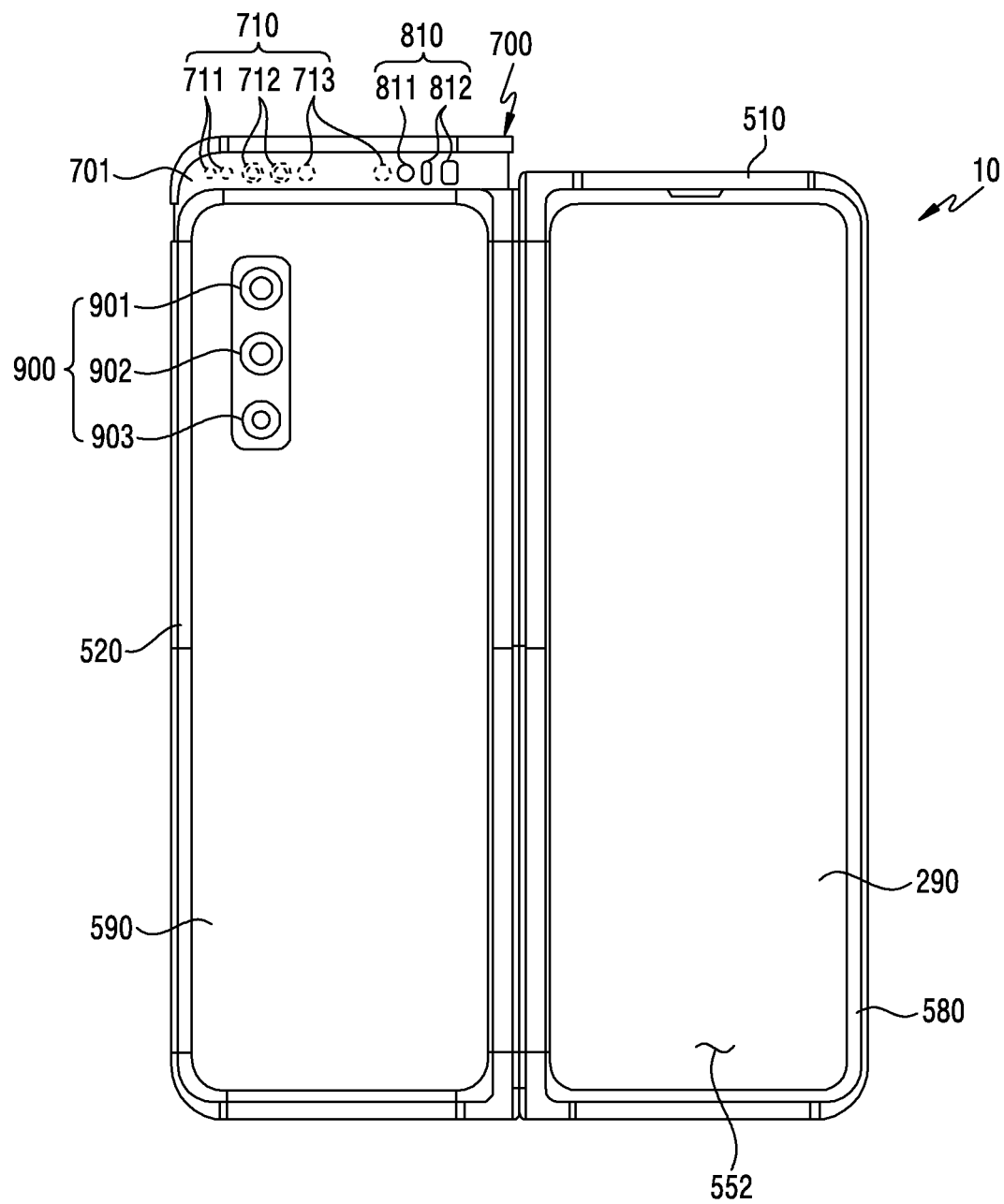
FIG. 9 is a view illustrating an unfolding state of an electronic device according to certain embodiments.

FIG. 8 is a view illustrating an unfolding state of an electronic device according to certain embodiments, and FIG. 9 is a view illustrating an unfolding state of an electronic device according to certain embodiments.

Referring to FIG. 8, the electronic device 10 may include a first display 200, a first housing structure 510, a second housing structure 520, and a sliding structure 700.

The first display 200 may include a first area 201 disposed in the first housing structure, a second area 202 disposed in the second housing structure, and a folding area 203. In the folding state of the foldable housing 500, the first area 201 disposed in the first housing structure 510 may contact the second area 202 disposed in the second housing structure 520. According to certain embodiments, the first display 200 may be disposed to occupy most of a surface of the first housing structure 510 and the second housing structure 520.

According to certain embodiments, the sliding structure 700 may include a sliding member 701 and a first optical input/output device 710. The sliding member 710 may have a plate shape, and may be disposed to define a part of a side surface of the second housing structure 520. When the first optical input/output device 710 is in an inactive state, the sliding structure 700 may be located in the interior of the second housing structure 520. When the first optical input/output device 710 is in an active state, the sliding structure 700 may be located outside the second housing structure 520. The first optical input/output device 710 may include a plurality of cameras 711 and at least one sensor 712.

According to certain embodiments, the sliding structure 700 may be exposed to the outside of the second housing structure 520 or be located in the interior of the second housing structure 520 by an intended input of a user, for example, by touching a sliding area (e.g., a sliding area 524 of FIG. 2), by touching the sliding structure, by pressing a surface of the display or a specific area of the housing, or clicking a physical key (not illustrated) that is located outside. According to another embodiment, the sliding structure 700 may be exposed to the outside of the second housing structure 520 or be located in the interior of the second housing structure 520 by touching an icon displayed in an area of the first display 200 or performing a specific application. The sliding structure 700 may move linearly to be exposed to the outside of the second housing by a driver connected to the sliding member 701.

Referring to FIG. 9, the second display 290 may be disposed on the second surface 552 of the first housing structure 510 or a first rear cover 580 of the first housing structure 510. The second display 290 may be disposed as a full screen that occupies an a partial area of the second surface 552 of the first housing structure 510 or occupies most areas of the second surface 552 of the first housing structure 510. The second rear cover 590 of the second housing structure 520 may include a second optical input/output device 900. The second optical input/output device 900 may include a plurality of cameras 901, 902, and 903. The plurality of cameras 901, 902, and 903 may be cameras that performs different functions. For example, the plurality of cameras 901, 902, and 903 may include a general camera, a wide angle camera, or a telescopic camera. In addition to the above-mentioned cameras, the second optical input/output device 900 may further include a depth-of-field camera (or a time-of-flight (TOF) camera). The second optical input/output device 900 may deliver images acquired by the plurality of cameras to the processor, and the plurality of delivered images may be processed by the processor.

When the second optical input/output device 900 is used in an unfolding state, the electronic device 10 may expose a third optical input/output device 810 in a direction that the second rear cover 590 of the second housing structure 520 faces. The third optical input/output device 810 may be disposed on an surface of the sliding structure 700, which is opposite to the sliding member 701, on which the first optical input/output device 710 is disposed. A plurality of parts 811 and 812 included in the third optical input/output device 810 may assist utilization of the second optical input/output device 900. For example, the third optical input/output device 810 may include an LED flash, a proximity sensor, or a biometric sensor.

According to certain embodiments, in the unfolding state, the first rear cover 580 of the first housing structure 510 may be located on the same plane, on which the second rear cover 590 of the second housing structure 520 is located. In the unfolding state, the third optical input/output device 810 that protrudes from the interior of the second housing structure 520 to the outside and is exposed may be exposed to a direction that is the same as the direction in which the second optical input/output device 900 is disposed. In the folding state, the third optical input/output device 810 that protrudes from the interior of the second housing structure 520 to the outside and is exposed may be exposed to a direction that is the same as the direction in which the second optical input/output device 900 is disposed. For example, the third optical input/output device 810 may be utilized to assist the second optical input/output device 900 in both the folding state and the unfolding state.

In certain embodiments of the disclosure, second screen 552 can provide display a live picture that is captured by the cameras 901, 902, and 903, thereby, allowing subjects being photographed to adjust their positions (standing in the center of the viewing area, etc.) for the photograph.

Figure 10:
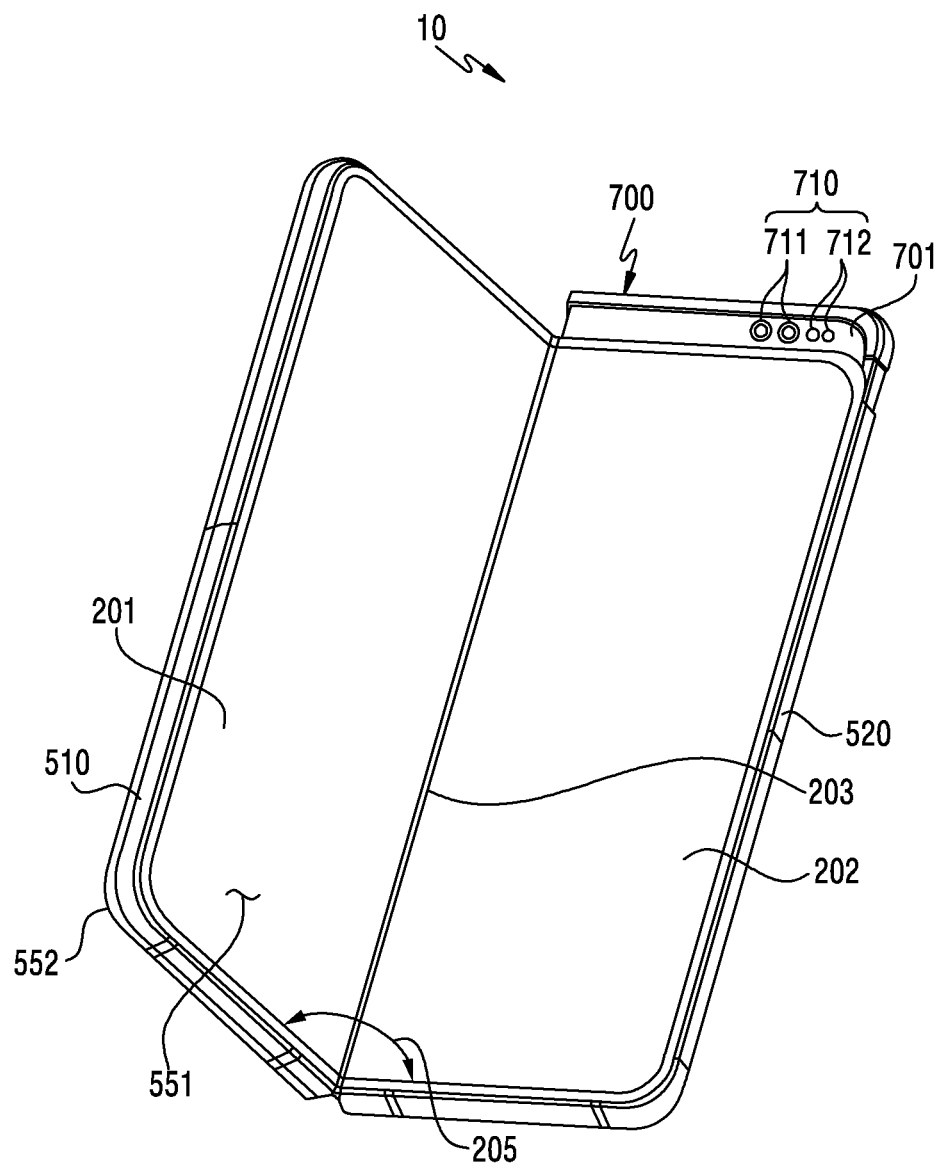
FIG. 10 is a view illustrating a state in which an electronic device is deformed from an unfolding state to a folding state according to certain embodiments.

FIG. 10 is a view illustrating a state in which an electronic device is deformed from an unfolding state to a folding state according to certain embodiments.

Referring to FIG. 10, the electronic device 10 may include a first display 200. The first display 200 may include a first area 201 disposed on the first surface 551 of the first housing structure 510, a second area 202 disposed on the first surface 551 of the second housing structure 520, and a folding area 203 that divides the first area 201 and the second area 202 and may be bent when the first display 200 is converted to a folding state by a hinge structure.

According to certain embodiments, the sliding structure 700 may protrude from the second housing structure 520. For example, when an intended input of a user is made or a specific application is performed, the sliding structure 700 received in the interior of the second housing structure 520 may move toward a part of a periphery of the second housing structure 520 and be exposed to the outside of the second housing structure 520. According to certain embodiments, when a specific application is performed or a gesture is input by a user, the processor (e.g., the processor 120 of FIG. 1) may control the sliding structure 700 to move by using a driver coupled to the sliding structure 700 in response to performance of the specific application or the input. When the sliding structure 700 protrudes, the first optical input/output device 710 disposed on one surface of the sliding member 701 may be in an active state. In a state in which at least one camera 711 or at least one sensor 712 is active, the screen, on which the first display 200 is displayed, may be converted or the at least one camera 711 or the at least one sensor 712 may be deactivated according to the angle 205 defined by the first housing structure 510 and the second housing structure 520.

For example, when the angle 205 defined by the first housing structure 510 and the second housing structure 520 is smaller than a first angle in the folding state of the electronic device 10, the processor may activate the screen only in the second area 202 of the first display 200. When a selfie is captured by using at least one camera 711, the screen may be converted such that a preview of the selfie is displayed only in the second area 202. When the angle 205 defined by the first housing structure 510 and the second housing structure 520 is smaller than a second angle that is smaller than the first angle, the first display 200 may be deactivated, the first optical input/output device 710 disposed in the sliding structure 700 may be deactivated, and the sliding structure 700 may move into the interior of the second housing structure 520 and be received therein.

According to certain embodiments, when a specific input (for example, a touch at a specific location displayed on the screen of the display, a specific gesture, or an input through a button or a physical key displayed on the screen of the display) of a user before the electronic device 10 is folded, and the angle 205 defined by the first housing structure 510 and the second housing structure 520 is smaller than the first angle, the processor (e.g., the processor 120 of FIG. 1) may control the screen displayed on the first display 200 to be displayed on the second display (e.g., the second display 290 of FIG. 6A) disposed on the rare surface of the second housing structure 520 in response to the detected angle 205 and the specific input of the user. According to certain embodiments, the first optical input/output device 710 of the sliding structure 700 may maintain its active state and may keep being exposed to the outside.

According to certain embodiments, differently from the above-mentioned contents, if it is detected that the angle 205 defined by the first housing structure 510 and the second housing structure 520 is smaller than the first angle without any specific input, the processor 120 may control the screen disposed on the first display 200 to be converted to be displayed on the second display (e.g., the second display 290 of FIG. 6A) disposed on the rear side of the second housing structure 520 in response to the detected angle. According to certain embodiments, the first optical input/output device 710 of the sliding structure 700 may be set to maintain its active state and keep being exposed to the outside.

According to certain embodiments, when the angle 205 defined by the first housing structure 510 and the second housing structure 520 is larger than the first angle in the folding state of the electronic device 10, the screen displayed on the second display 290 may be converted to the first display 200. For example, when a selfie is captured by using at least one camera 711 in the folding state, the processor may convert a preview image displayed on the second display 290 such that the preview image is displayed on the first display 200. When the angle 205 defined by the first housing structure 510 and the second housing structure 520 is larger than a second angle that is smaller than the first angle, the processor may deactivate the second display 290 and activate the first display 200, and the first optical input/output device 710 disposed in the sliding structure 700 may maintain an active state.

In certain embodiments, a camera application can use cameras 901, 902, 903, and 711. Cameras 901, 902, and 903 face away from the user, while camera 711 faces the user. The camera application can detect whether the electronic device 10 is in the folded configuration or unfolded configuration. When the electronic device 10 is in the unfolded configuration, the camera application can select cameras 901, 902, 903 and display the preview image on the first display 200. When the electronic device 10 is in the folded configuration, the camera application can use cameras 711 and display the preview picture on the second display 290.

Figure 11A:
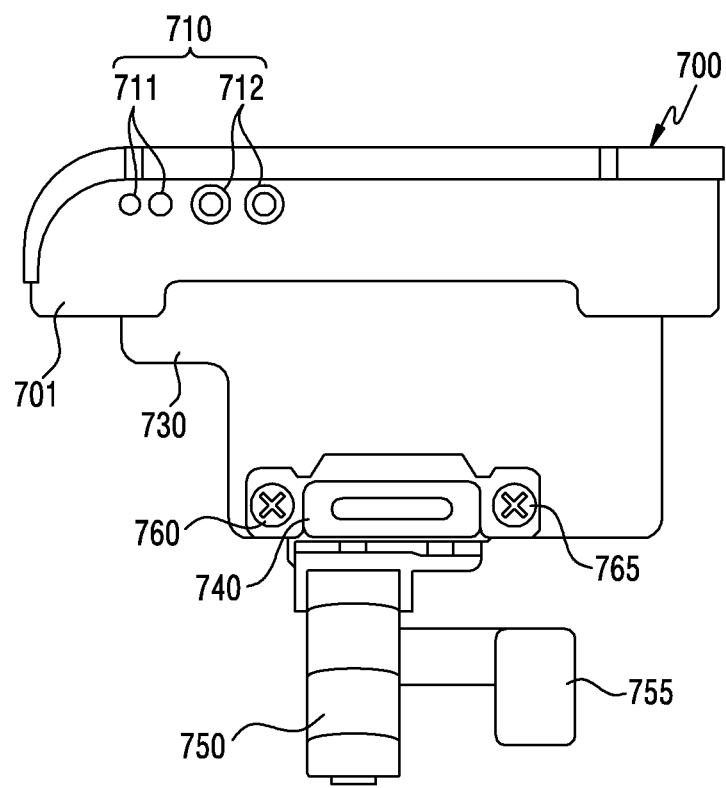
FIG. 11A is a plan view of a sliding structure included in an electronic device according to certain embodiments.
Figure 11B:
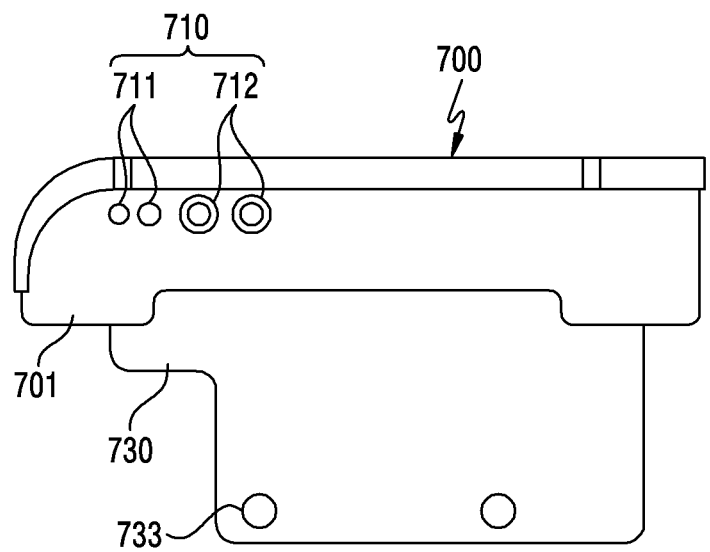
FIG. 11B is an exploded view of the sliding structure of FIG. 11A.
Figure 11B:
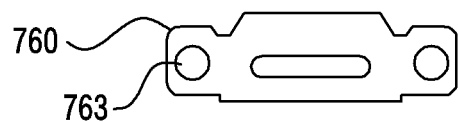
Figure 11B:
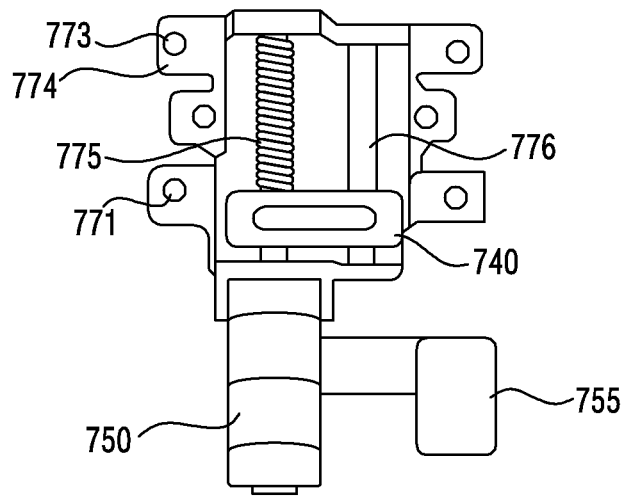

FIG. 11A is a plan view of a sliding structure included in an electronic device according to certain embodiments, and FIG. 11B is an exploded view of the sliding structure of FIG. 11A.

Referring to FIGS. 11A and 11B, the sliding structure 700 may include a sliding member 701, a printed circuit board 730, and a driver 750.

According to certain embodiments, the sliding member 701 may include a first optical input/output device disposed on one surface thereof, and may be coupled to the printed circuit board 730. The first optical input/output device 710 may be electrically connected to the printed circuit board 730, and may transmit and receive a signal to and from the processor (e.g., the processor 120 of FIG. 1) of the electronic device 10. The printed circuit board 730 may include a first opening 733 disposed at a portion thereof, and may be coupled to the driver 750 through the first opening 733.

According to certain embodiments, the driver 750 may include a connector 755 that may be connected to a main printed circuit board (e.g., a first board 610 or a second board 620 of FIG. 4) of the electronic device 10. The first opening 733 disposed in the printed circuit board 730 may be coupled to a second opening disposed in a fixing member 760. The fixing member 760 may have a second opening 763 corresponding to the first opening 733. The fixing member 763 may be coupled to the printed circuit board 730 and the driver 750.

According to certain embodiments, the driver 750 may include a ball screw 775 that is rotated by power of the driver 750, and may include a guide groove disposed in parallel to the ball screw 775. The driver 750 may further include a guide member 740 that may be linearly reciprocated by the ball screw 775. The guide member 740 may be coupled to the fixing member 760 through fitting or snap-coupling, and may be bonded to the fixing member 760. The first opening 733 and the second opening 763 of the fixing member 760 may be coupled to each other by using a screw 765. The fixing member 760 may be coupled to the guide member 740, and the sliding member 701 may be linearly reciprocated by the guide member 740. The guide member 740 may include a screw groove corresponding to a screw thread of the ball screw 775 in an area, in which the guide member 740 contacts the ball screw 775, and may be moved forwards and rearwards as the ball screw 775 rotates. In order to facilitate movement of the guide member 740, a protrusion (not illustrated) corresponding to the guide groove 776 may be provided.

According to certain embodiments, the driver 750 may include a plurality of openings 771 and 773 to be coupled to a bracket of the second housing structure 520. The plurality of openings 771 and 773 may be disposed in a flange 774 disposed in the driver 750.

Figure 11C:
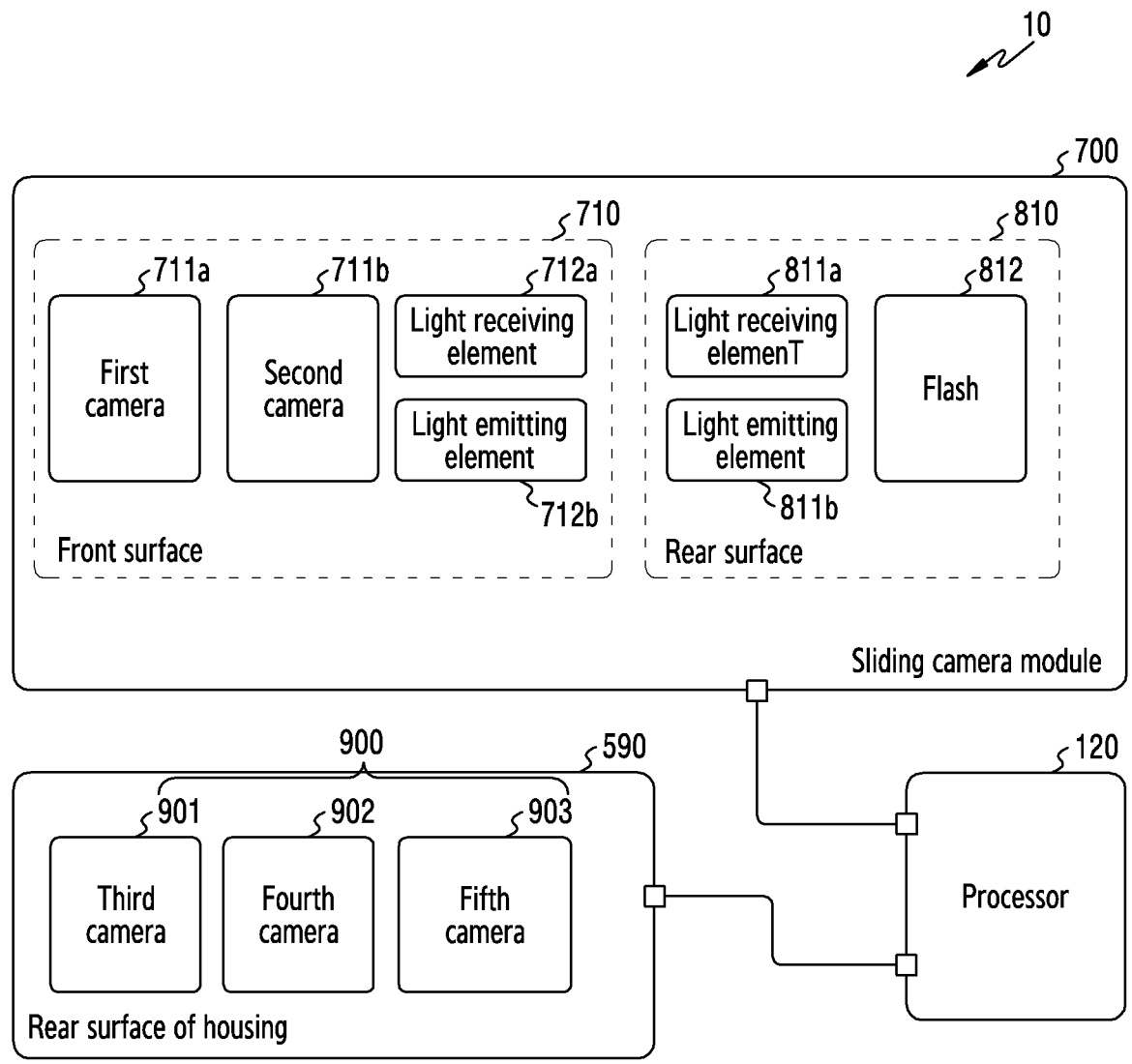
FIG. 11C is a block diagram illustrating the sliding structure of FIG. 11A and a camera module disposed on a rear surface of a housing.

FIG. 11C is a block diagram illustrating a camera module disposed on the sliding structure and a rear surface of a housing of FIG. 11A, and FIG. 11C is a block diagram illustrating a camera module disposed on the sliding structure and a rear surface of a housing of FIG. 11A.

Referring to FIG. 11C, the electronic device 10 may include a sliding structure 700, a processor 120, and a second rear cover 590 of a foldable housing.

According to certain embodiments, the sliding structure 700 may include a first input/output device 710 mounted on a front surface thereof, and a third input/output device 810 mounted on a rear surface thereof. The first optical input/output device 710 may include a plurality of cameras 711a, 711b, and 713, a light receiving element 712a, and a light emitting element 712b. The first camera 711a may be a general camera, and the second camera 711b may be a Bohek camera or a telescopic camera. The first camera 711a may capture and form an image and the second camera 711b may form an image made by out-focusing a captured image. A final image may be formed by coupling the image captured by the first camera 711a and the image captured by the second camera 711b and correcting the coupled images. The light receiving element 712a and the light emitting element 712b may be utilized as constituent elements of a proximity sensor.

According to certain embodiments, the third optical input/output device 810 may include at least one sensor 811a and 811b and a flash 812. The third optical input/output device 810 may provide a sensor that is necessary for the second optical input/output device 900 located on the second rear cover 590 of the housing. The second optical input/output device 900 may include a third camera 901, a fourth camera 902, or a fifth camera 903. The third camera 901, the fourth camera 902, and the fifth camera 903 may be cameras having different characteristics. For example, the third camera 901, the fourth camera 902, and the fifth camera 903 may be a general camera, a wide angle camera, and a telescopic camera, respectively. The images captured by the third camera 901, the fourth camera 902, and the fifth camera 903 may be corrected into one image through a combination thereof.

The third optical input/output device 810 may include a flash 812, and may provide a light source for the second optical input/output device 900 disposed in the second rear cover 590 of the housing.

Figure 11D:
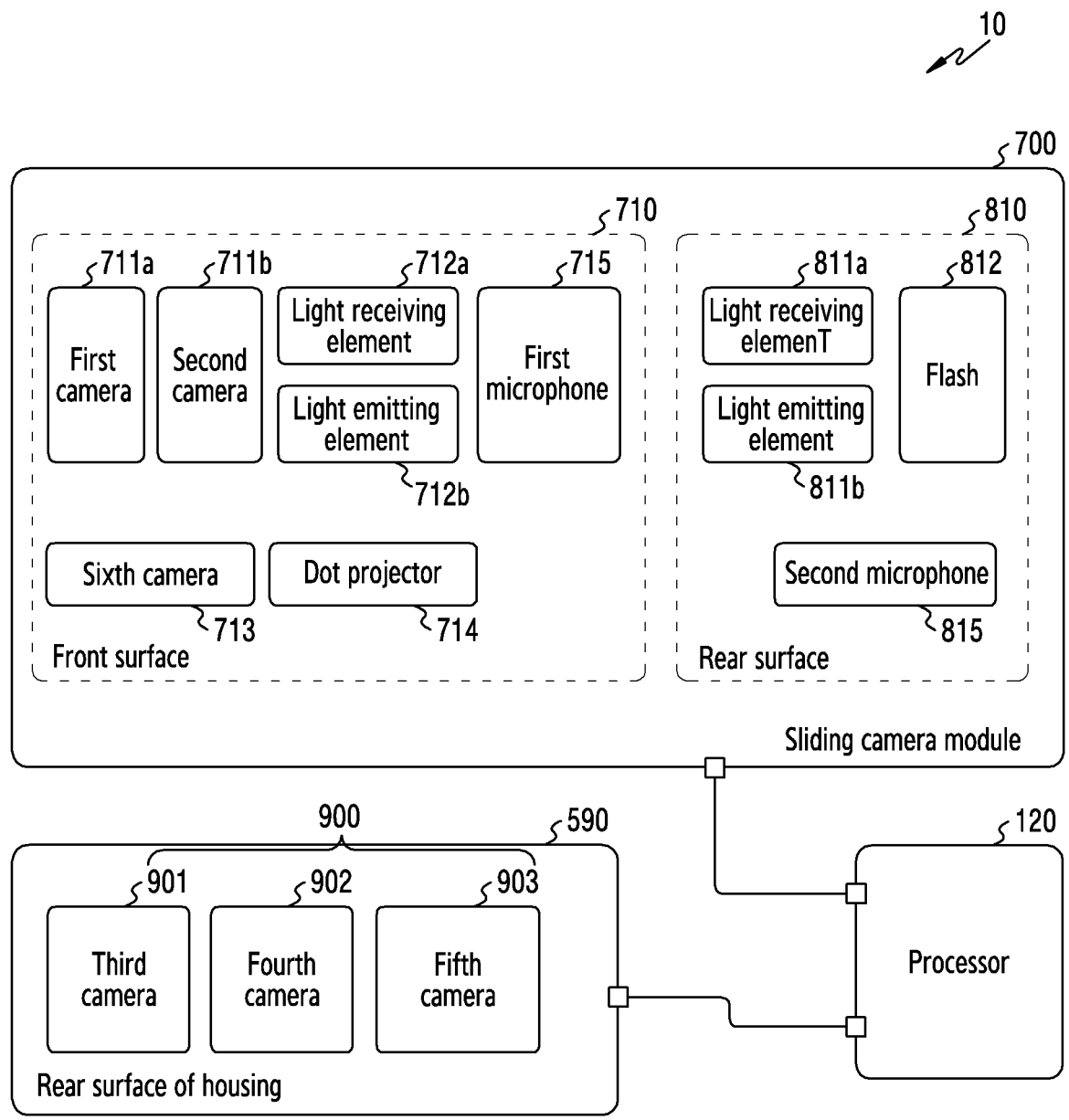
FIG. 11D is a block diagram illustrating the sliding structure of FIG. 11A and a camera module disposed on a rear surface of a housing.

Referring to FIG. 11D, the sliding structure 700 may further include a sixth camera 713, a dot projector 714, a first microphone 715, and a second microphone 815. According to certain embodiments, the first optical input/output device 710 mounted on a front surface of the sliding structure 700 may further include a first microphone 715, a sixth camera 713, and a dot projector 714. The third optical input/output device 810 disposed on a rear surface of the sliding structure 700 may further include a second microphone 815.

The sixth camera 713 may be a camera for 3D recognition. For example, the sixth camera 713 may be a depth camera. The dot projector 714 may be disposed on the front surface 710 of the sliding structure 700, and may detect the height of an external object together with the sixth camera 713 by irradiating a plurality of laser beams, and may be utilized for an authentication operation of the electronic device.

According to certain embodiments, when the sliding structure 700 protrudes in the housing, the first microphone 715 or the second microphone 815 may be activated and an audio may be recorded.

According to certain embodiments, if a specific application is performed, the sliding structure 700 may protrude to the outside of the electronic device 10. The processor (e.g., the processor 120 of FIG. 1) may activate the first microphone 715 or the second microphone 815 located in a direction in which the user is located. As another example, an audio of the directions of 360 degrees may be recorded by activating the first microphone 715 and the second microphone 815 at the same time.

Figure 12:
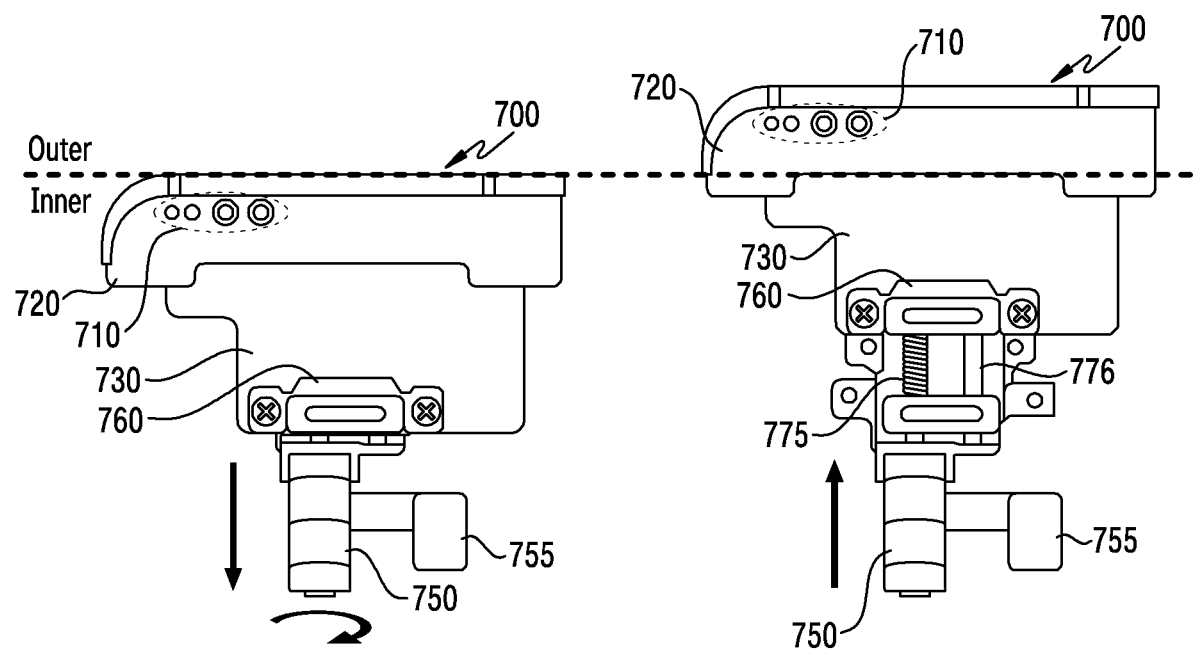
FIG. 12 is a view illustrating an operation of the sliding structure of FIG. 11A.
Figure 13:
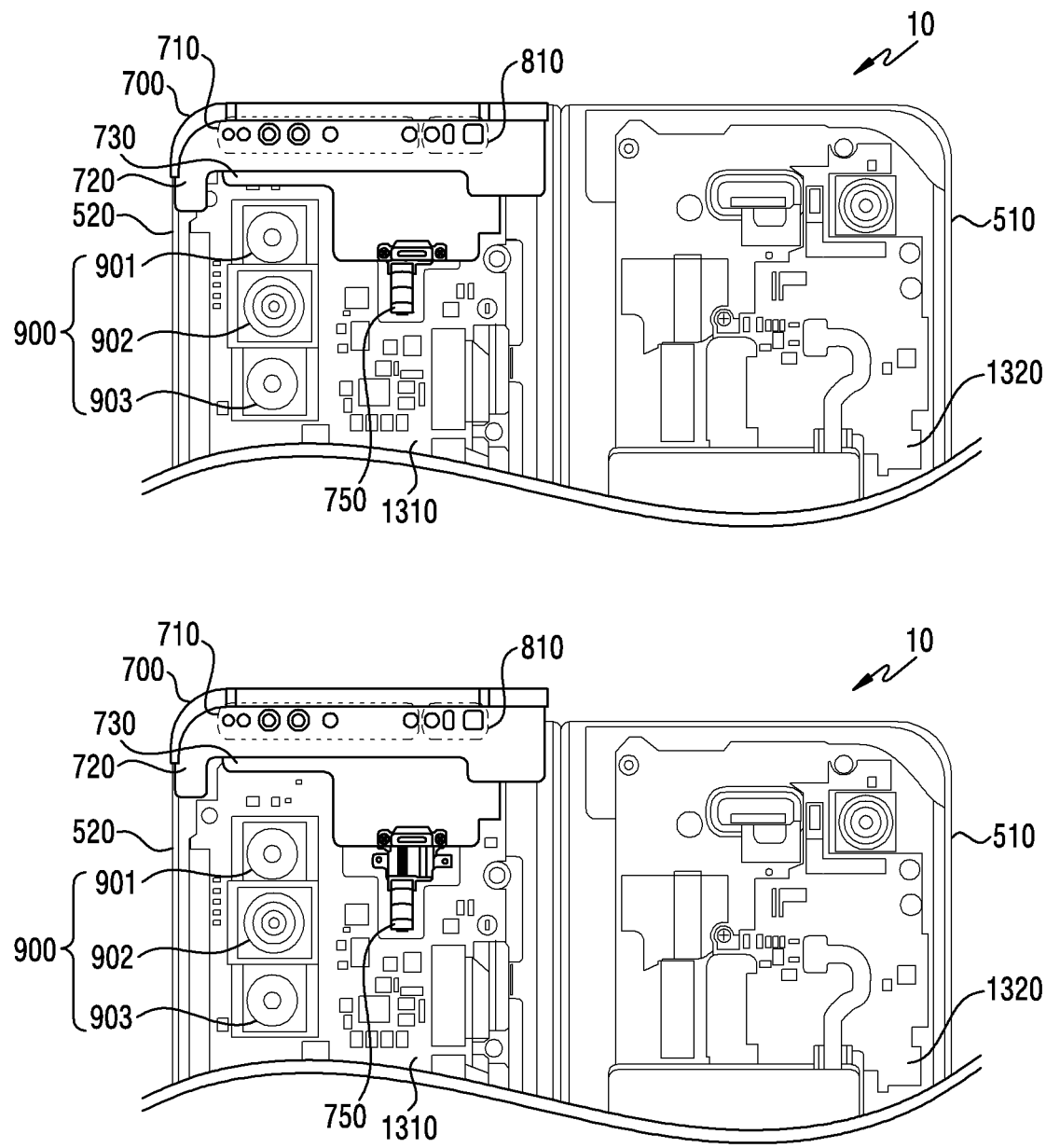
FIG. 13 is a view illustrating an operation of the sliding structure of FIG. 11A in the interior of a housing.

FIG. 12 is a view illustrating an operation of the sliding structure of FIG. 11A. FIG. 13 is a view illustrating an operation of the sliding structure of FIG. 11A in the interior of a housing.

Referring to FIGS. 12 and 13, the electronic device 10 may include a first housing structure 510, a second housing structure 520, and a sliding structure 700. The second housing structure 520 may include a second optical input/output device 900 including third to fifth cameras 901, 902, and 903, and the sliding structure 700 may be provided in the interior of the second housing structure 520. The third camera 901 may be a general camera, the fourth camera 902 may be a wide angle camera, and the fifth camera 903 may be a telescopic camera. According to certain embodiments, the second optical input/output device 520 may further include a depth-of-field camera (or a time-of-flight (TOF) camera) in addition to the third to fifth cameras 901, 902, and 903.

According to certain embodiments, the sliding structure 700 located in the interior of the electronic device 10 may be exposed to the outside of the electronic device 10 through rotation of the driver 750. If a driving signal is received from the processor (e.g., the processor 120 of FIG. 1) though the connector 755, the driver 750 may be rotated. If the driver 750 is rotated, the ball screw 775 coupled to a shaft of the driver 750 may be rotated, and the guide member 740 engaged with the ball screw 775 may be linearly moved along the guide groove 776. If the driver 750 is rotated, the printed circuit board 730 coupled to the guide member 740 by the fixing member 760 may be linearly reciprocated. As the printed circuit board 730 is moved, the sliding structure 701 coupled to the printed circuit board 730 may be moved, and the first optical input/output device 710 mounted on the sliding structure 701 may be exposed to the outside.

According to certain embodiments, the first optical input/output device 710 may be disposed on a surface that is the same as the direction of a surface, to which a first display (e.g., the first display 200 of FIG. 5) disposed on the first surface 551 defined by the first housing structure 510 and the second housing structure 520 may be disposed, is exposed, and the third optical input/output device 810 may be disposed to face the second surface 552 of the first housing structure 510.

The driver 750 may be electrically connected to the first printed circuit board 1310 or the second printed circuit board 1320, and may transmit and receive a signal to and from a processor connected to the first printed circuit board 1310 or the second printed circuit board 1320. The processor (e.g., the processor 120 of FIG. 1) may control the driver 750 on the basis of signals detected by various sensors.

Figure 14A:
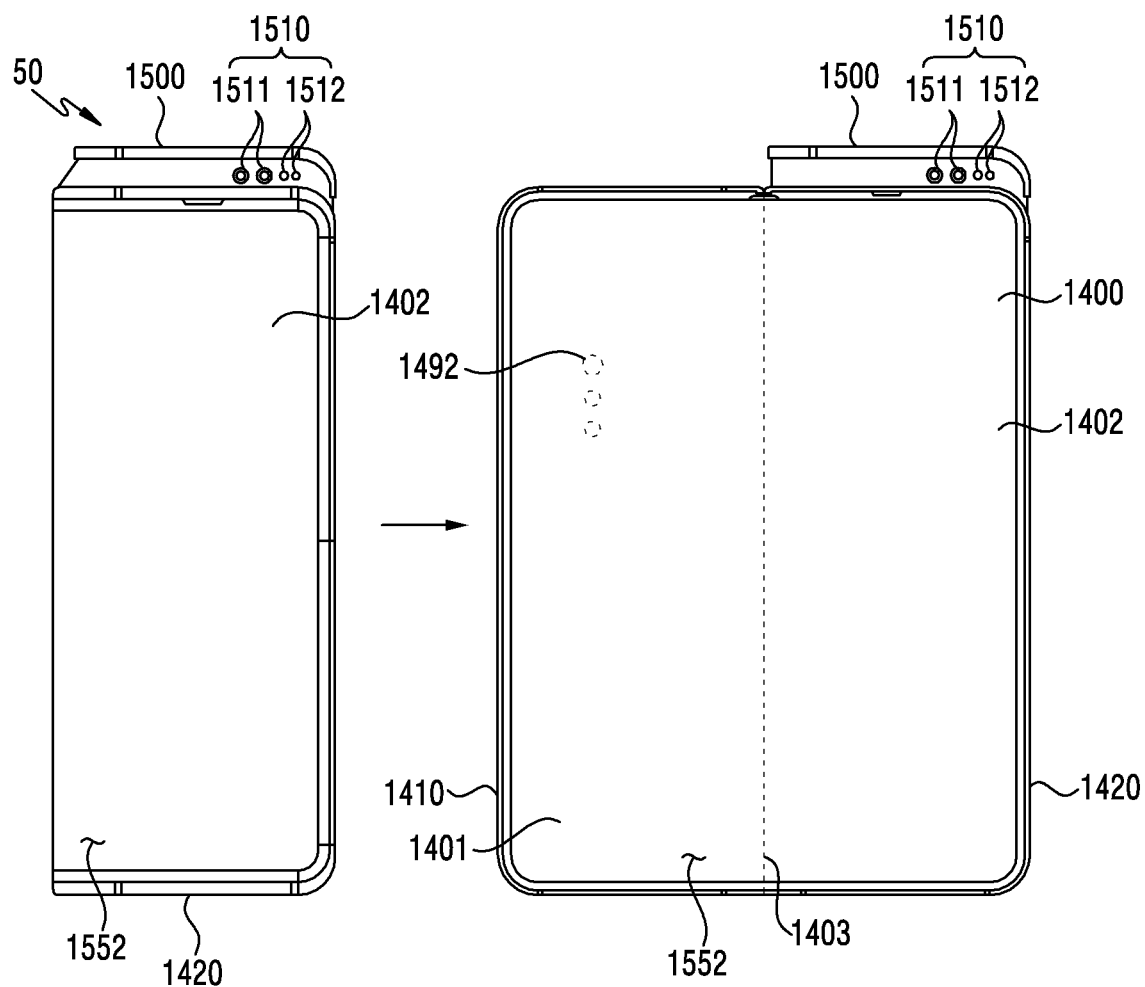
FIG. 14A is a view illustrating that an electronic device including an out foldable display is converted from a folding state to an unfolding state according to certain embodiments.
Figure 14B:
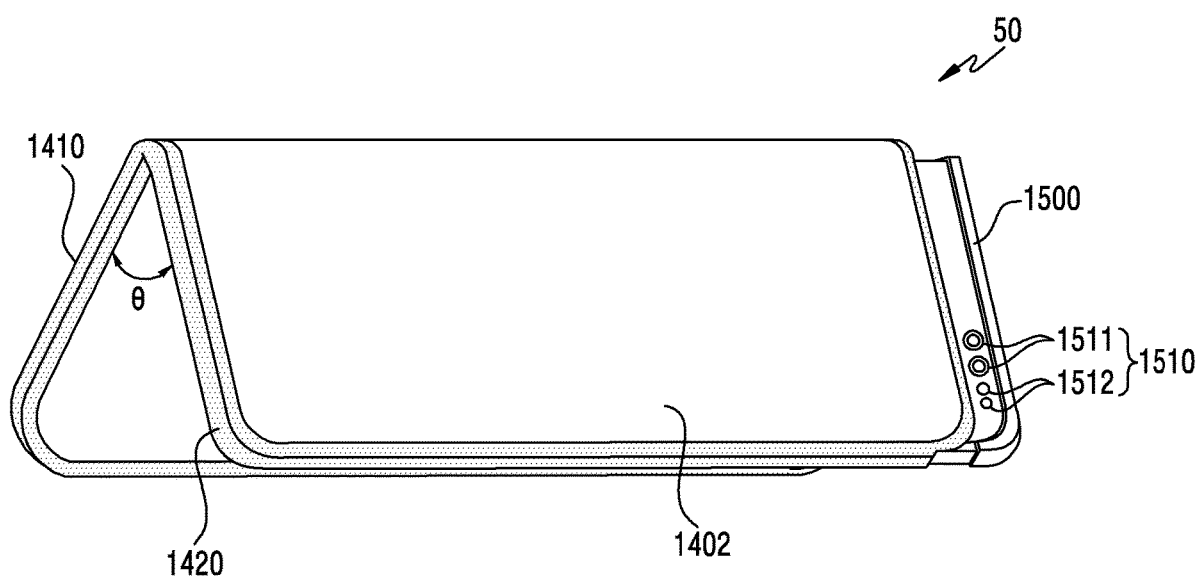
FIG. 14B is a view illustrating a holding state of an out foldable display electronic device according to certain embodiments.

FIG. 14A is a view illustrating that an electronic device including an out foldable display is converted from a folding state to an unfolding state according to certain embodiments. FIG. 14B is a view illustrating a holding state of an out foldable display electronic device according to certain embodiments.

Figure 15A:
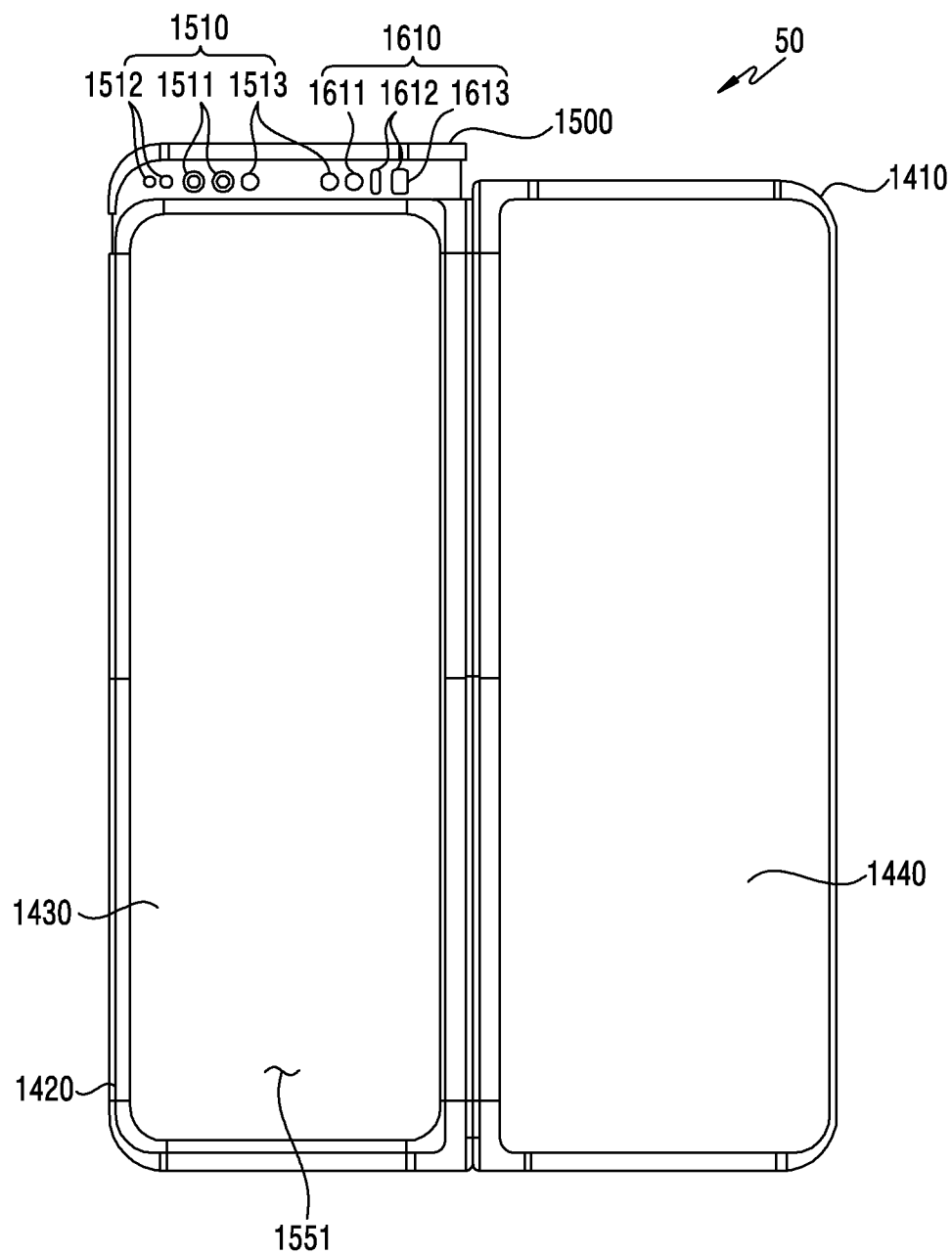
FIG. 15A is a rear view in an unfolding state of the electronic device of FIG. 14A.
Figure 15B:
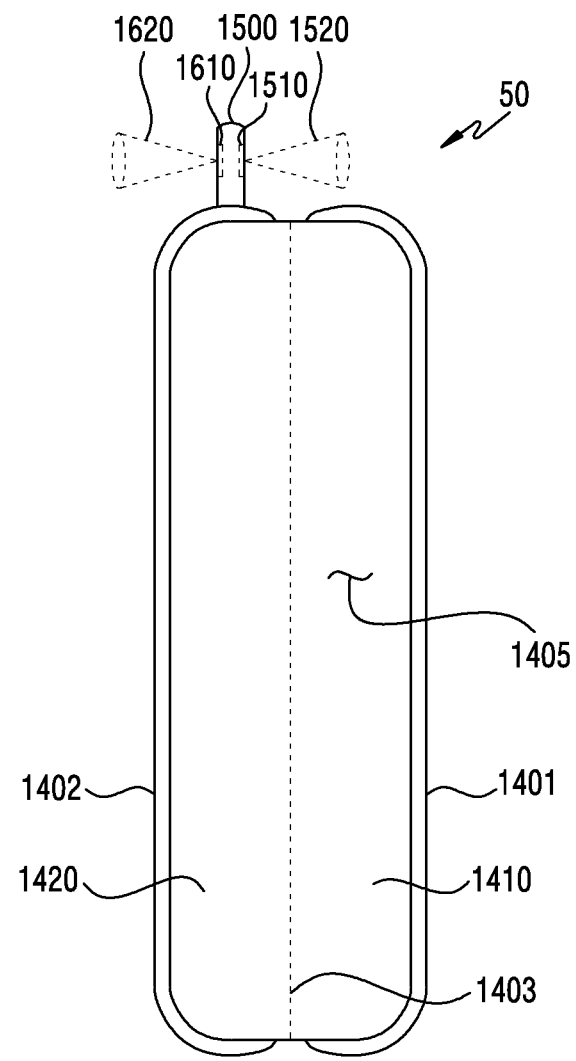
FIG. 15B is a side view in a folding state of the electronic device of FIG. 14A.

FIG. 15A is a rear view in an unfolding state of the electronic device of FIG. 14A. FIG. 15B is a side view in a folding state of the electronic device of FIG. 14A. Referring to FIG. 4A, an electronic device 50 (e.g., the electronic device 101 of FIG. 1) may include a foldable housing 1410 and 1420 (e.g., the foldable housing 500 of FIG. 5A), and a flexible display 1400.

According to certain embodiments, the foldable housing 1410 and 1420 may include a first surface 1551, and a second surface 1552 of the electronic device 50, a first housing structure 1410, and a second housing structure 1420. In an unfolding state of the electronic device 50, the first surface 1551 of the first housing structure 1410 and the first surface 1552 of the second housing structure 1420, and the second surface 1552 of the first housing structure 1410 and the second surface 1552 of the second housing structure 1420 may be defined on the same plane. The first surface 1551 may be spaced apart from the second surface 1552. The first housing structure 1410 may at least partially surround a space defined by the first surface 1551 and the second surface 1552. The second housing structure 1420 may at least partially surround the remaining parts of the space defined by the first surface 1551 and the second surface 1552.

According to certain embodiments, the first housing structure 1410 and the second housing structure 1420 may be connected to a hinge structure. The hinge structure may convert the state of the foldable housing 1410 and 1420 into a folding or unfolding state. The first housing 1410, the second housing structure 1420, and a part of the hinge cover (e.g., the hinge cover 530 of FIG. 3) may define a side surface that surrounds the space between the first surface 1551 and the second surface 1552 of the foldable housing.

According to certain embodiments, in the folding state of the foldable housing, the first surface 1551 disposed in the first housing structure 1410 may contact the first surface 1551 disposed in the second housing structure 1420.

According to certain embodiments, the first display 1400 may be disposed on the first surface 1552, and may be present over the first housing structure 1410 and the second housing structure 1420, and may be bent about a hinge axis. The first display 1400 may include a first area 1401 disposed in the first housing structure 510, a second area 1402 disposed in the second housing structure, and a folding area 1403. In the unfolding state of the foldable housing, the first area 1401 disposed in the first housing structure 1410 may face a direction that is opposite to the second area 1402 disposed in the second housing structure 1420 in the folding state.

According to certain embodiments, the first display 1400 may be disposed to occupy most of the second surface 1552 of the first housing structure 1410 and the second housing structure 1420. The first optical input/output device 1510 and the second optical input/output device 1610, such as cameras or proximity sensors, may be mounted in the interior of the electronic device 50, and only when the first optical input/output device 1510 and the second optical input/output device 1610 are active, they may be exposed to the outside of the electronic device 50. For example, when the first optical input/output device 1510 and the second optical input/output device 1610 are inactive, the sliding structure 1500 may be received in the interior of the second housing structure 1420, and when the first optical input/output device 1510 and/or the second optical input/output device 1610 are active, the sliding structure 1500 may protrude from the interior of the second housing structure 1420 to the outside.

The second surface 1552 of the electronic device 50 may include at least one third optical input/output device 1492. The third optical input/output device 1492 may be disposed at a lower portion of the first display 1400, and may be disposed in the first area 1401. The third optical input/output device 1492, as illustrated, may be disposed at the center of the first area 1401, and may be disposed at a periphery of the first area 1401 for an aesthetic effect, and the location of the third optical input/output device 1492 is not limited.

Referring to FIG. 14B, the first housing structure 1410 and the second housing structure 1420 of the electronic device 50 may be folded while an angle θ defined therebetween. The angle θ may be an angle by which the electronic device 50 may be held. The first area 1401 and the second area 1402 of the out folding type electronic device 50 may face the outside in a bending state. When the electronic device 450 is held, the user may view the first area 1401 and the second area 1402 from the outside. For example, the display 1400 of the electronic device 50 may be folded such that it may be viewed from the outside, and peripheries of the first housing 1410 and the second housing 1420 may contact a table or a desk such that the electronic device 50 may be held.

According to certain embodiments, the sliding structure 1510 of the held electronic device 50 may protrude to a side. The first camera 1511 or the second camera 1512 disposed in the protruding sliding structure 1510 may perform photography.

Referring to FIG. 15A, the first surface 1551 of the electronic device 50 may be disposed on a rear side of the housing, and the rear side 1430 of the first housing structure 1410 and the rear surface 1440 of the second housing structure 1420 may be disposed flat. The second optical input/output device 1610 may include at least one camera 1611, and an image acquired through the at least one camera 1611 may be previewed or displayed on the first display 1401. The second optical input/output device 1610 may include at least one sensor 1612. The at least one sensor 1612 may include an illumination sensor and a proximity sensor. The second optical input/output device 1610 may include a separate flash 1613, and may further include a heart rate sensor (not illustrated).

Referring to FIG. 15, the sliding structure 1500 may protrude from the second housing structure 1420. The first optical input/output device 1510 of the protruding sliding structure 1500 may be disposed to face the direction, to which the first area 1401 of the display 1400 disposed in the first housing structure 1410 is exposed. The first optical input/output device 1510 may accommodate light corresponding to an angle 1520 of view of photographing that is progressed by a lens. According to certain embodiments, the sliding structure 1500 including the first optical input/output device 1510 may sufficiently protrude such that the first housing structure 1410 and the second housing structure 1420 do not interfere with the angle 1520 of view of photographing.

According to certain embodiments, the second optical input/output device 1610 may be disposed to face a direction, to which the second area of the display 1400 disposed in the second housing structure 1410 is exposed. The second optical input/output device 1610 may accommodate light corresponding to an angle 1620 of view of photographing that is progressed by a lens. According to certain embodiments, the sliding structure 1500 including the second optical input/output device 1610 may sufficiently protrude such that the first housing structure 1410 does not interfere with the angle 1620 of view of photographing.

Figure 16:
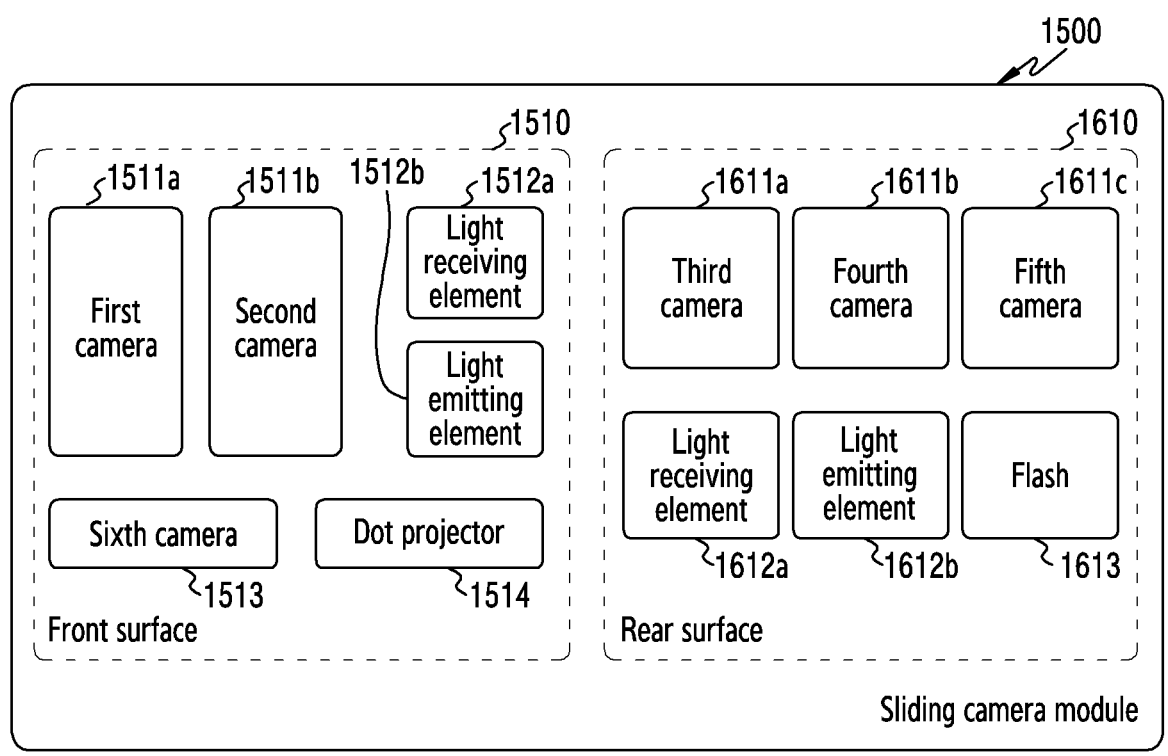
FIG. 16 is a block diagram illustrating a sliding structure according to certain embodiments.

FIG. 16 is a block diagram illustrating a sliding structure according to certain embodiments.

Referring to FIG. 16, the sliding structure 1500 may include a first input/output device 1510 mounted on a front surface thereof, and a second input/output device 1610 mounted on a rear surface thereof. The first optical input/output device 1510 may include a plurality of cameras 1511a, 1511b, and 1513, proximity sensors 1512a and 1512b, and a dot projector 1514. The first camera 1511a may be a general camera, and the second camera 1511b may be a Bohek camera (or a wide angle camera) or a telescopic camera. The first camera 1511a may capture and form an image and the second camera 1511b may form an image made by out-focusing the captured image. A final image may be formed by coupling the image captured by the first camera 1511a and the image captured by the second camera 1511b and correcting the coupled images. The light receiving element 1512a and the light emitting element 1512b may be utilized as constituent elements of a proximity sensor.

The sixth camera 1513 may be a camera for 3D recognition, and for example, may be a depth camera. The dot projector 1514 may irradiate a plurality of laser beams and detect the height of an external object together with the sixth camera 1513, and may be utilized in an authentication operation of the electronic device.

According to certain embodiments, the second optical input/output device 1610 may include a plurality of cameras 1611a, 1611b, and 1611c, proximity sensors 1612a and 1612b, and a flash 1613. The third camera 1611a, the fourth camera 1611b, and the fifth camera 1611c may be cameras having different characteristics. For example, the third camera 1611a, the fourth camera 1611b, and the fifth camera 1611c may be a general camera, a wide angle camera, and a telescopic camera, respectively. The images captured by the third camera 1611a, the fourth camera 1611b, and the fifth camera 1611c may be corrected into one image through a combination thereof. The flash 1613 may provide a light sourced for the cameras 1611a, 1611b, and 1611c disposed on a plurality of rear surfaces.

Figure 17:
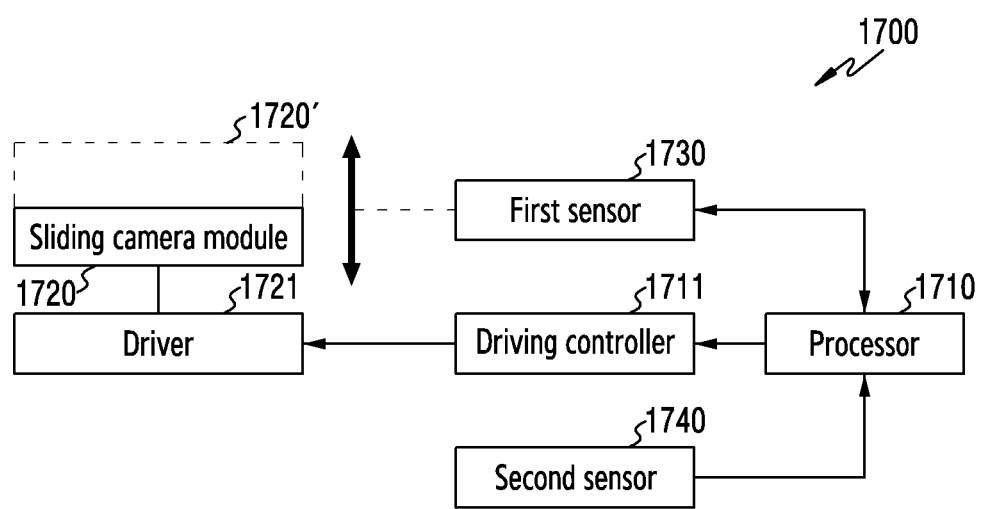
FIG. 17 is a block diagram illustrating an operation of an electronic device including a sliding structure according to certain embodiments.

FIG. 17 is a block diagram illustrating an operation of an electronic device including a sliding structure according to certain embodiments.

Referring to FIG. 17, an electronic device 1700 (e.g., the electronic device 10 of FIG. 2) may include a processor 1710, a sliding structure 1720, a driving controller 1711, a first sensor 1730, and a second sensor 1740. A processor 1710 (e.g., the processor 120 of FIG. 1) may control the driving controller 1711 connected to the processor 120 by executing software (e.g., the program 140 of FIG. 1). The processor 1710 may control the driving controller 1711 through information detected by the first sensor 1730 or the second sensor 1740. Further, the processor 1710 may directly control the driver 1721 without passing via the driver 1711.

According to certain embodiments, the first sensor 1730 may detect the location of the sliding structure 1720. Through this, it may be determined whether the sliding structure 1720 is in a pop-up state or a pop-down state. The second sensor 1740 may detect a folding angle (e.g., the angle 205 of FIG. 9) of the foldable housing (e.g., the foldable housing 500 of FIG. 5A). The processor 1710 may determine a folding state of the electronic device on the basis of the detected angle, and may control the driver 1721 such that the sliding structure is exposed to the outside of the housing or is received in the interior of the housing when the specific app is executed.

The driver 1720 may expose the sliding structure 1720' to the outside on the basis of a signal delivered from the processor 1710, or may dispose the sliding structure 1720 in the interior of the housing.

Figure 18:
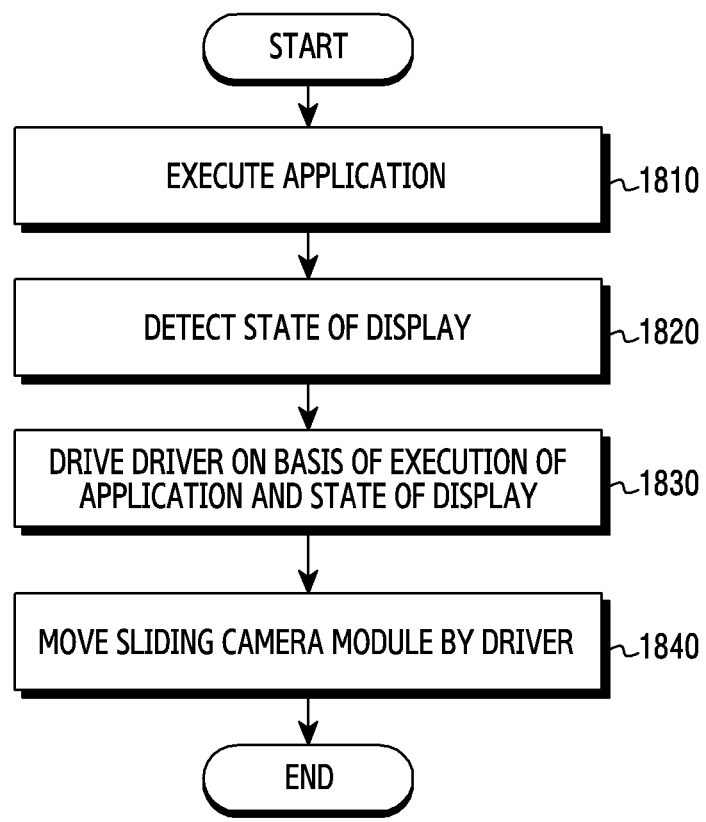
FIG. 18 is a flowchart illustrating an operation of a sliding structure according to certain embodiments.

FIG. 18 is a flowchart illustrating an operation of a sliding structure according to certain embodiments.

Referring to FIG. 18, in operation 1810, an application (e.g., the software 140 of FIG. 1) may be executed through input of a user. A specific software list may be stored in a memory (e.g., the memory 130 of FIG. 1). For example, a camera application or a video call application may be stored in the memory, and the processor (e.g., the processor 120 of FIG. 1) may compare the specific application with an execution application.

In operation 1820, a folding state of the display 200 may be detected. The processor may detect the angle of the display through the second sensor (e.g., the second sensor 1740 of FIG. 17) if it is determined, through comparison of the specific application and the execution application, that the execution application is included in the specific application. The processor may determine the state of the display on the basis of the detected angle of the display. For example, if the angle of the display is 180 degrees, it may be determined that the display is in an unfolding state, and if the angle of the display is 0 degrees, it may be determined that the display is in a folding state. As another example, if the angle of the display gradually increases, the state of the display may be being converted from a folding state to an unfolding state, and if the angle of the display gradually decreases, the state of the display may be being converted from an unfolding state to a folding state In operation 1830, the processor may control the driver to be driven, in response to a folding state of the display and an execution application. The driver may be determined whether the execution application is a specific application and the display is a folding state.

In operation 1840, the sliding structure may be moved through driving of the driver, and if the sliding structure is completely moved, the processor may activate the camera.

According to certain embodiments, if a specific application is executed when the camera application or the video call application is the specific application, the processor may detect the current folding state of the display, drive the driver, expose the sliding structure to the outside, and activate the first optical input/output device 710. When the first optical input/output device 710 is active and the state of the display is converted from a folding state to an unfolding state, the processor may maintain the active state of the first optical input/output device 710 and also maintain the exposure state of the sliding structure without driving the driver.

As another example, when the first optical input/output device is active and the state of the display is converted from the unfolding state to the folding state, the processor may display the contents displayed on the first display, on the second display. For example, in response to the fact that the state of the display is converted to a folding state, the processor may display the preview image displayed on the first display, on the second display disposed outside the housing.

As another example, when the specific application is ended (ending of a camera application or ending of a voice call) in a state in which the first optical input/output device is active, the processor may convert the state of the first optical input/output device to an inactive state while driving the driver. Through the driving of the driver, the sliding structure may be moved to the interior of the housing.

As another example, if an authentication is requested in a locking state of the electronic device while a standby state application is being executed, the processor may expose the sliding structure to the outside by driving the driver, and through this, may perform an authentication operation by utilizing the 3D camera and the dot projector included in the first optical input/output device.

According to another embodiment, if the camera application is executed and the mode enters into a main camera photographing mode instead of a selfie camera, the processor may detect the current folding state of the display, expose the sliding structure to the outside by driving the driver, and activate the sensor module (e.g., the third optical input/output device 810 of FIG. 11C) located on the rear surface of the sliding structure. When the sensor module is active and the state of the display is converted from a folding state to an unfolding state, the processor may deactivate the sensor module without driving the driver, and may receive the sliding structure in the interior of the housing.

Figure 19A:
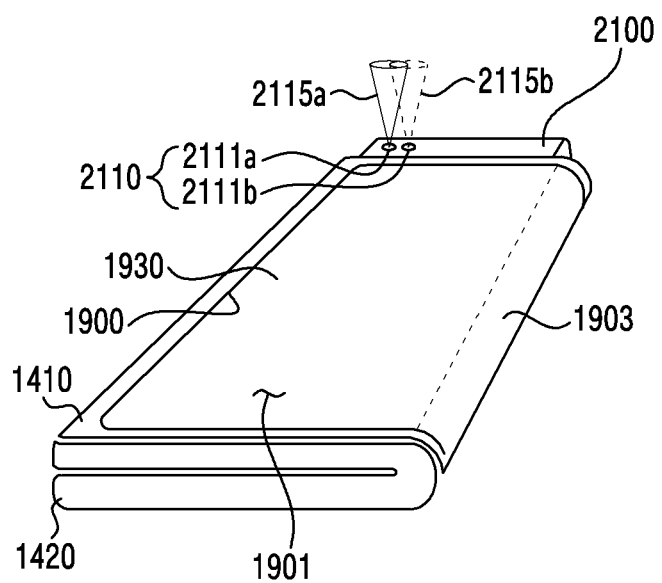
FIG. 19A is a perspective view in a folding state of an electronic device, in which a camera module is disposed on one surface of a sliding structure according to certain embodiments.
Figure 19B:
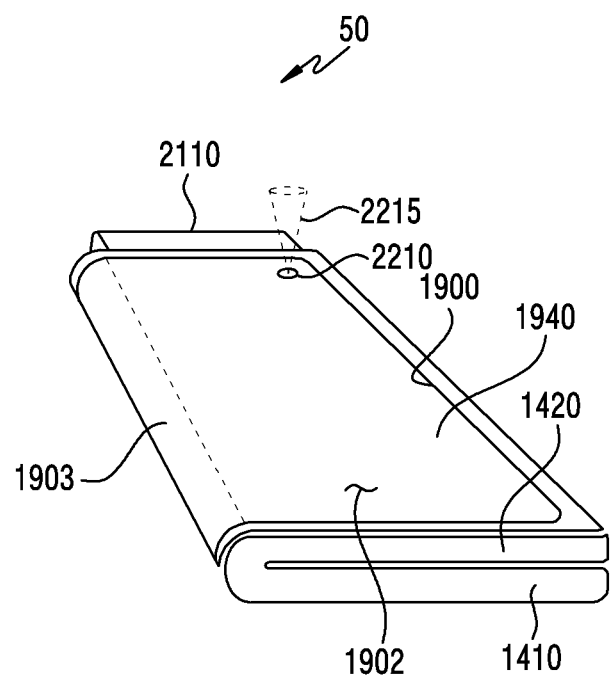
FIG. 19B is a perspective view in a folding state of an electronic device, in which a camera module is disposed on one surface of a sliding structure according to certain embodiments.
Figure 19C:
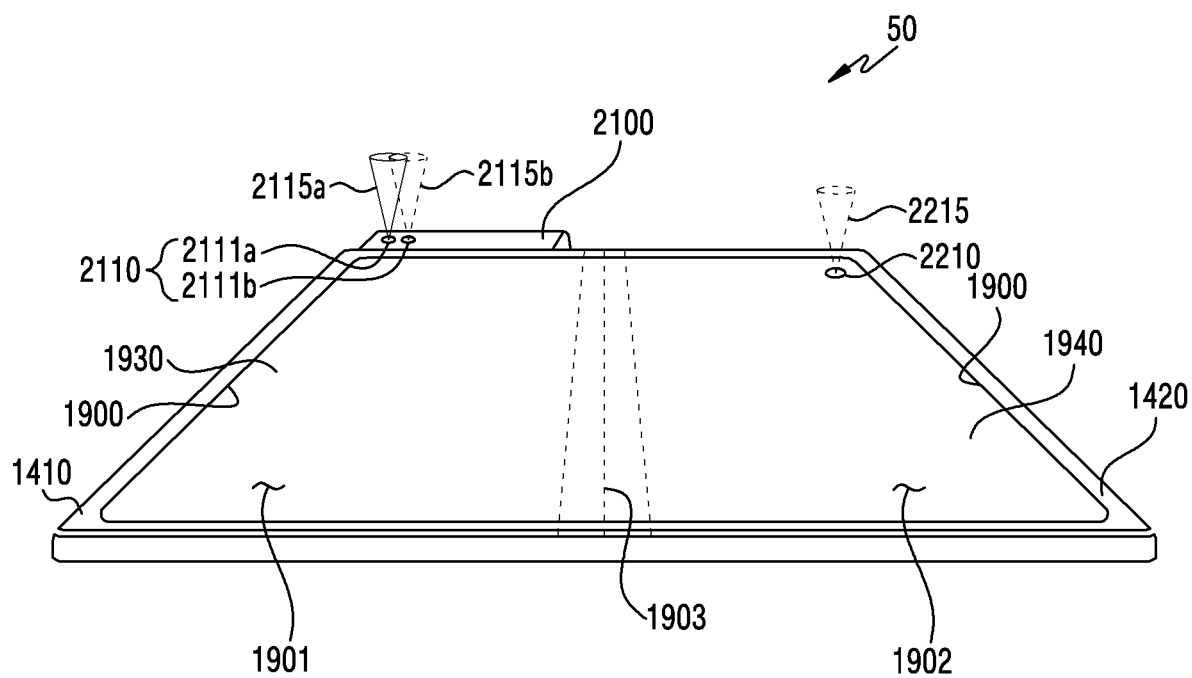
FIG. 19C is a perspective view of an unfolding state of the electronic device of FIG. 19D.

FIG. 19A is a perspective view in a folding state of an electronic device, in which a camera module is disposed on one surface of a sliding structure according to certain embodiments, and FIG. 19B is a perspective view in a folding state of an electronic device, in which a camera module is disposed on one surface of a sliding structure according to certain embodiments. FIG. 19C is a perspective view of an unfolding state of the electronic device of FIG. 19A.

Referring to FIGS. 19A, 19B, and 19C, the electronic device 50 may include a foldable housing 1410 and 1420 (e.g., the foldable housing 500 of FIG. 5A) and a display 1900 (or a flexible display).

According to certain embodiments, the foldable housing 1410 and 1420 may include a first surface 1930, and a second surface 1940 of the electronic device 50, a first housing structure 1410, and a second housing structure 1420. The first housing structure 1410 may at least partially surround a space defined by the first surface 1930 and the second surface 1940. The second housing structure 1420 may at least partially surround the remaining parts of the space defined by the first surface 1930 and the second surface 1940.

According to certain embodiments, the first housing structure 1410 and the second housing structure 1420 may be connected to a hinge structure. The hinge structure may convert the state of the foldable housing 1410 and 1420 into a folding or unfolding state. The first housing 1410, the second housing structure 1420, and a part of the hinge cover (e.g., the hinge cover 530 of FIG. 3) may define a side surface that surrounds the space between the first surface 1930 and the second surface 1940 of the foldable housing.

According to certain embodiments, in the folding state of the foldable housing, the first surface 1930 disposed in the first housing structure 1410 and the first surface 1930 disposed in the second housing structure 1420 may face opposite directions.

According to certain embodiments, the display 1900 may be disposed on the first surface 1930, and may be present over the first housing structure 1410 and the second housing structure 1420, and may be bent about a hinge axis. The display 1900 may include a first area 1901 disposed in the first housing structure, a second area 1902 disposed in the second housing structure, and a folding area 1903.

According to certain embodiments, the display 1900 may be disposed to occupy most of the first surface 1930 of the first housing structure 1410 and the second housing structure 1420. The first optical input/output device 2110, such as a camera or a proximity sensor, may be mounted in the interior of the electronic device 50. The first optical input/output device 2110 may be disposed on one surface of the sliding structure 2100, and an optical input/output device may not be disposed on an opposite surface of the sliding structure 2100. For example, the first optical input/output device may be disposed on a surface of the sliding structure 2100, which faces the display 1900 (or the first surface 1930). A separate optical input/output device may not be disposed on a surface of the sliding structure 2100, which faces the second surface 1940. The optical input/output device included in the sliding structure 2100 may always view the display 1900. If the sliding structure 2100 protrudes, the first optical input/output device 2110 may be activated in a direction which the display 1900 faces.

The second optical input/output device 2210 may be disposed under the second area 1902 of the display 1900, and may be mounted in the interior of the electronic device. In an area in which the second optical input/output device 2210 is disposed, a pixel may not be disposed in the display 1900.

According to certain embodiments, in the folding state of the electronic device, the second optical input/output device 2210 may photograph a direction that is opposite to the photographing direction of the first optical input/output device 2110 disposed in the sliding structure 2100. In the unfolding state of the electronic device, the second optical input/output device 2210 may photograph a direction that is the same as the photographing direction of the first optical input/output device 2110 disposed in the sliding structure 2100.

The first optical input/output device 2110 may be exposed to the outside of the electronic device 50 only when the first optical input/output device 2110 is active. For example, when the first optical input/output device 2110 is inactive, the sliding structure 2100 may be received in the interior of the first housing structure 1410, and when the first optical input/output device 2110 is active, the sliding structure 2100 may protrude from the interior of the first housing structure 1410 to the outside.

According to certain embodiments, if the user views the first area 1901 when the display 1900 is in the folding state, the processor may activate the first camera 2111a and the second camera 2111b included in the first optical input/output device 2110 mounted on the sliding structure 2100. According to certain embodiments, the first camera 2111a may be a wide angle camera for a general subject, and the second camera 2111b may be a bokeh camera or a telescopic camera. When the user views the second area 1902, the processor may activate the second optical input/output device 2210 disposed at a lower portion of the display 1900.

Figure 20:
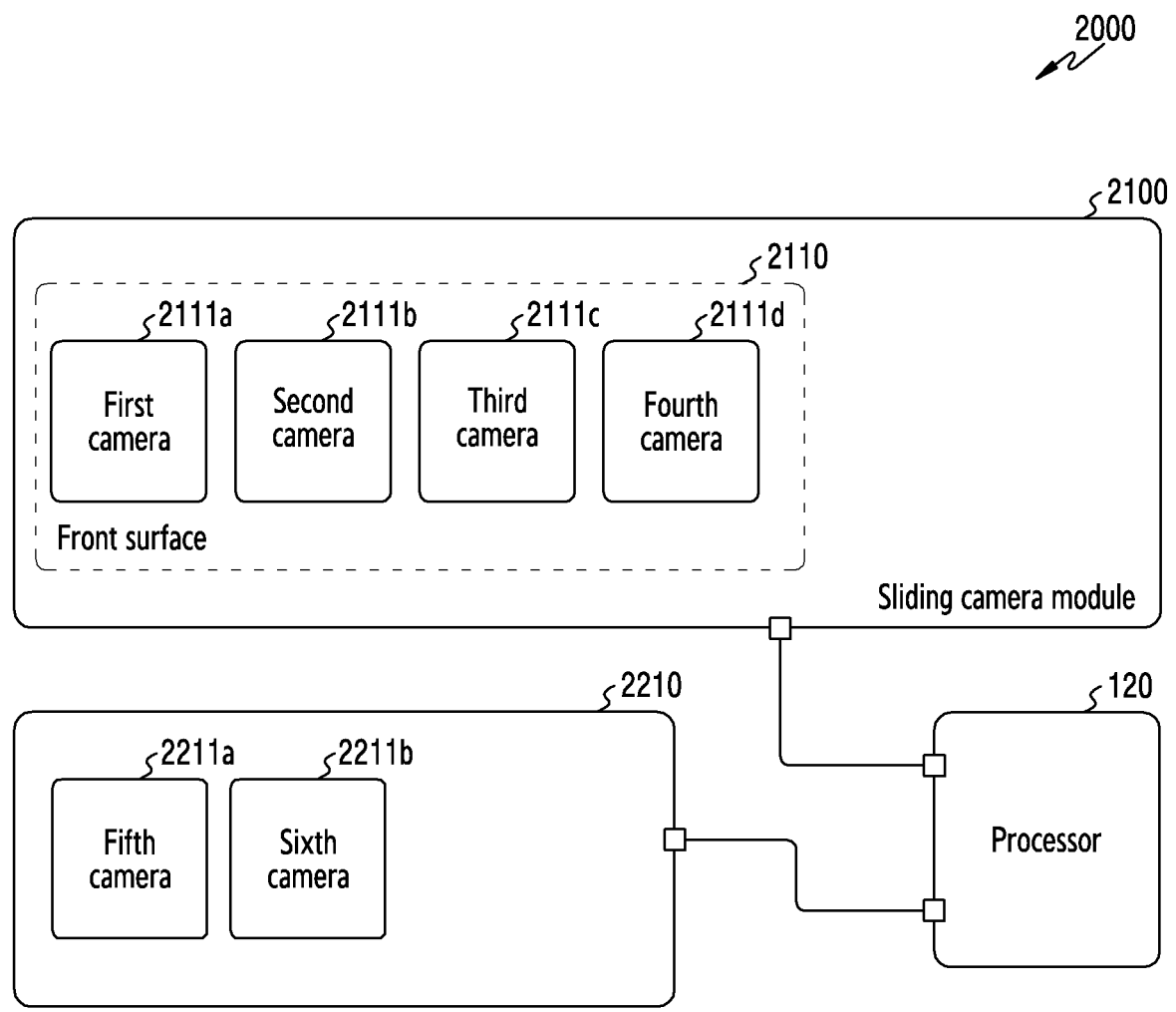
FIG. 20 is a block diagram of the sliding structure and a camera module disposed in an electronic device of FIG. 19A.

FIG. 20 is a block diagram of a camera module disposed in the sliding structure and the electronic device of FIG. 19A.

Referring to FIG. 20, an electronic device 2000 (e.g., the electronic device 50 of FIG. 19A) may include a sliding structure 2100, a processor 120, and a second optical input/output device 2210.

According to certain embodiments, the sliding structure 2100 may include a first optical input/output device 2110 mounted on a front surface thereof. An optical input/output device may not be included on a rear surface of the sliding structure 2100. The sliding structure 2100 may be slid in the interior of the first housing structure 1410, and may protrude to the outside of the first housing structure 1410 when it is necessary to activate the first optical input/output device 2110. The first optical input/output device 2110 may include a plurality of cameras 2111a, 2111b, 2111c, and 2111d. The first camera 2111a may be a wide angle camera for a general subject, and the second camera 2111b may be a bokeh camera or a telescopic camera. The third camera 2111c may include an ultra-wide angle camera. The fourth camera 2111d may include a depth-of-field camera (e.g., a time-of-flight (TOF) camera). The first camera 2111a may capture and form an image and the second camera 2111b may form an image made by out-focusing the captured image. The third camera 2111c may form an image that emphasizes a part of a specific subject, and the fourth camera 2111d may identify depth information in the acquired image. A final image may be formed by coupling the image captured by the first camera 2111a and the image captured by the second camera 211b and the third camera 211c and correcting the coupled images, and the depth information may be acquired by the fourth camera 2111d.

The second optical input/output device 2210 may include a fifth camera 2211a and a sixth camera 2211b. The fifth camera 2211a and the sixth camera 2211b may be cameras having different characteristics. For example, the fifth camera 2211a and the sixth camera 2211b may be one of a general camera, a wide angle camera, and a telescopic camera. The images captured by the fifth camera 2211a and the sixth camera 2211b may be corrected into one image through a combination thereof.

Figure 21:
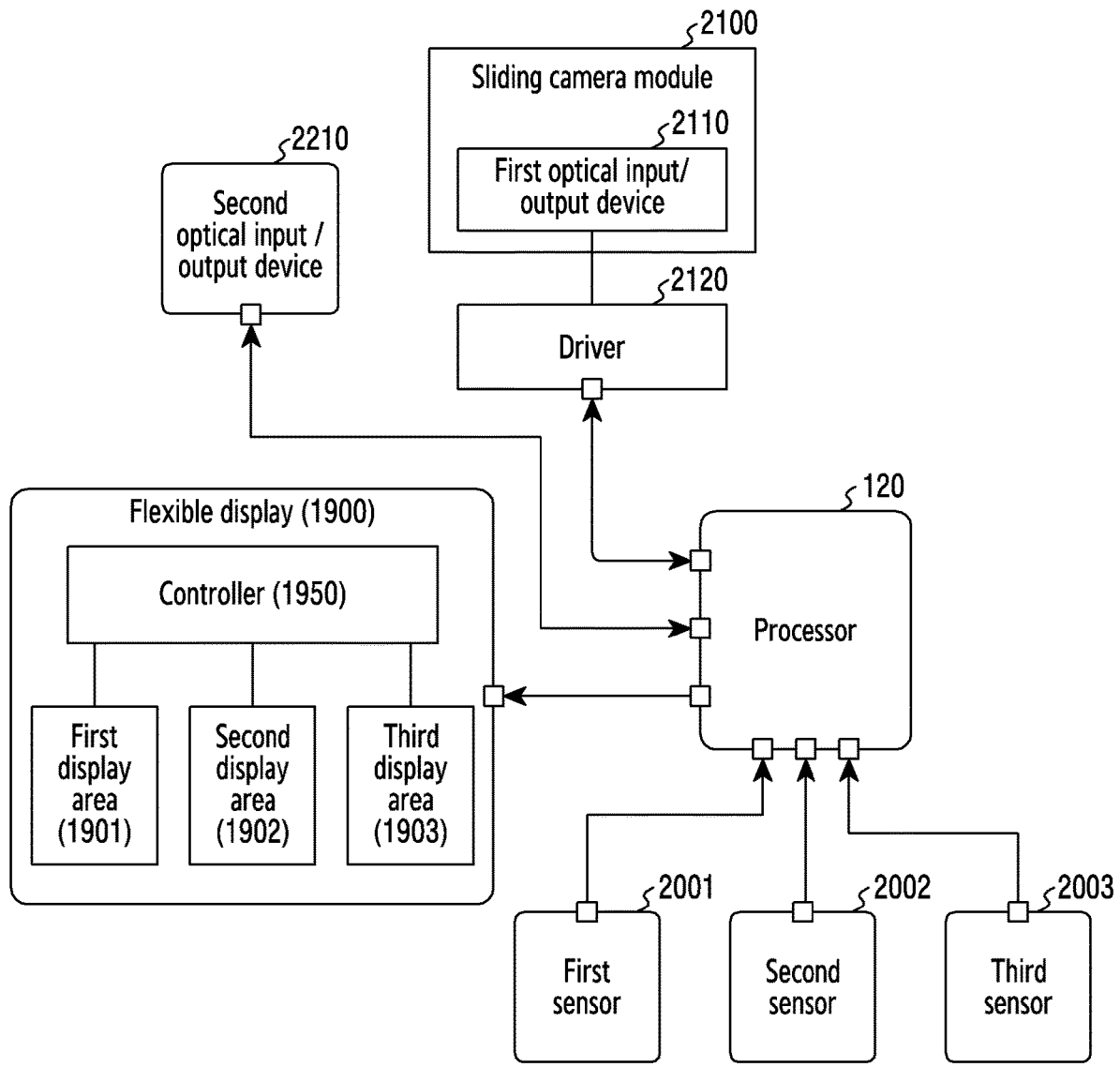
FIG. 21 is a block diagram of the electronic device of FIG. 19A.

FIG. 21 is a block diagram of the electronic device of FIG. 19A.

Referring to FIG. 21, an electronic device 2000 (e.g., the electronic device 50 of FIG. 19A) may include a processor 120, a display 1900 (or a flexible display), a first sensor 2001, a second sensor 2002, a third sensor 2003, a sliding structure 2100, a driver 2120, and a second optical input/output device 2210. The processor 120 may control the controller 1950 of the display 1900 and the driver 2120 of the sliding structure 2100 connected to the processor 120 by executing software (e.g., the program 140 of FIG. 1). The processor 120 may control the controller 1950 and the driver 2120 through information detected by the first sensor 2001 or the second sensor 2002.

According to certain embodiments, the first sensor 2001 may acquire an angle value between the first display area 1901 and the second display area 1902. The first sensor 2001 may deliver the acquired data to the processor 120. The processor 120 may determine the folding state or the unfolding state of the electronic device 2000 on the basis of the acquired angle value between the first display area 1901 and the second display area 1902. According to certain embodiments, the controller 1950 may display information on the first display area 1901, the second display area 1902, or the folding area 1903 (a third display area) of the display 1900 in response to the folding state or the unfolding state of the electronic device 2000. In the folding state, information may be displayed only in an area of the first display area 1901 or the second display area 1902, in the direction, which the user actually views, and in the unfolding state, information may be displayed in all the first display area 1901, the second display area 1902, and the folding area 1903. When the electronic device is in a middle state between the folding state and the unfolding state, an icon for displaying the state of the electronic device or manipulating an application may be displayed in the folding area 1903.

According to certain embodiments, the second sensor 2002 may be a motion sensor capable of determining the gravitational direction of the electronic device 2000. The second sensor 2002 may detect which is the surface of the electronic device 2000 which faces the gravitational direction. The second sensor 2002 may deliver the acquired sensing value to the processor 120 in the folding state of the electronic device 2000, and may identify the surfaces of the first display area 1901 and the second display area 1902, which face the direction that is opposite to the gravitational direction on the basis of the delivered sensing value.

According to certain embodiments, the third sensor 2003 may include a proximity sensor (e.g., an infrared ray sensor or an illumination sensor) or a touch sensor. The processor 120 may determine whether a user is on the phone or the electronic device is used, through the third sensor 2003. For example, the third sensor 2003 may detect whether an external object, such as the body of the user, approaches the display 1900 when contacting the external object for a voice communication. The processor 120 may deactivate the first optical input/output device 2110 included in the sliding structure 2100 in response to the detection of the external object, and may drive the driver 2120 of the sliding structure 2100. The sliding structure 2100 may be received in the interior of the electronic device by the driver 2120.

According to certain embodiments, the sliding structure 2100 may protrude to the outside of the electronic device 2000 or be received in the interior of the electronic device 2000 by the driver 2120. The process 120 may allow the sliding structure 2100 to protrude through the driver when a specific application is executed. The processor 120 may activate or deactivate the first optical input/output device 2110 and the second optical input/output device 2210 embedded in the display on the basis of the value detected through the first sensor 2001, the second sensor 2002, or the third sensor 2003.

Figure 22:
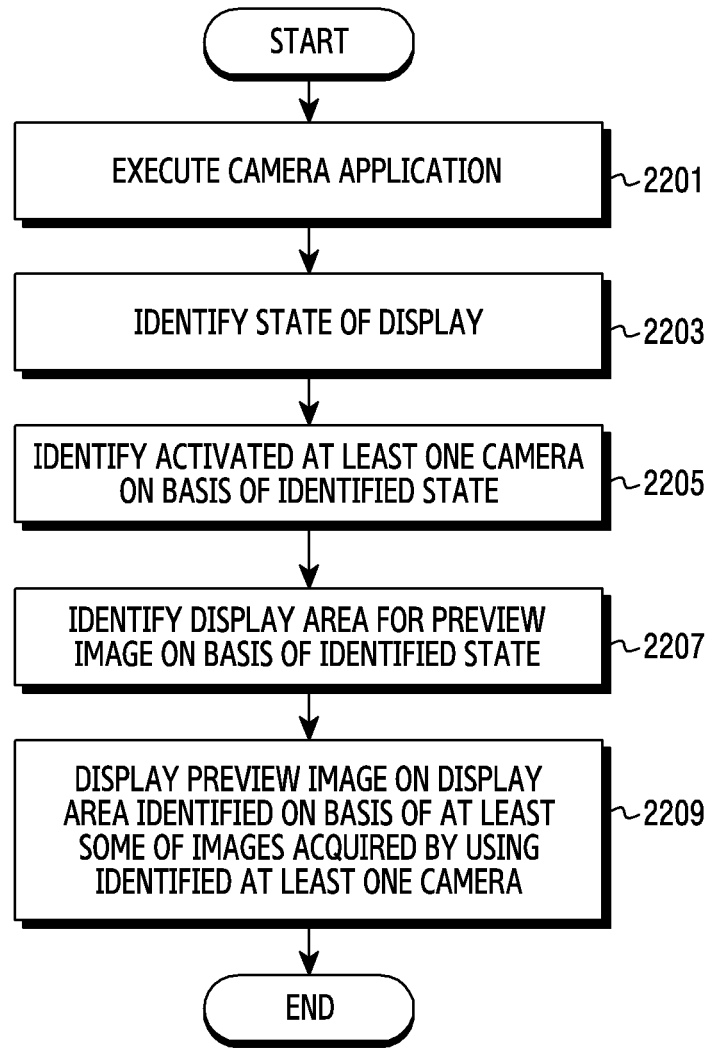
FIG. 22 is a block diagram illustrating an operation of an electronic device according to certain embodiments.
Figure 23A:
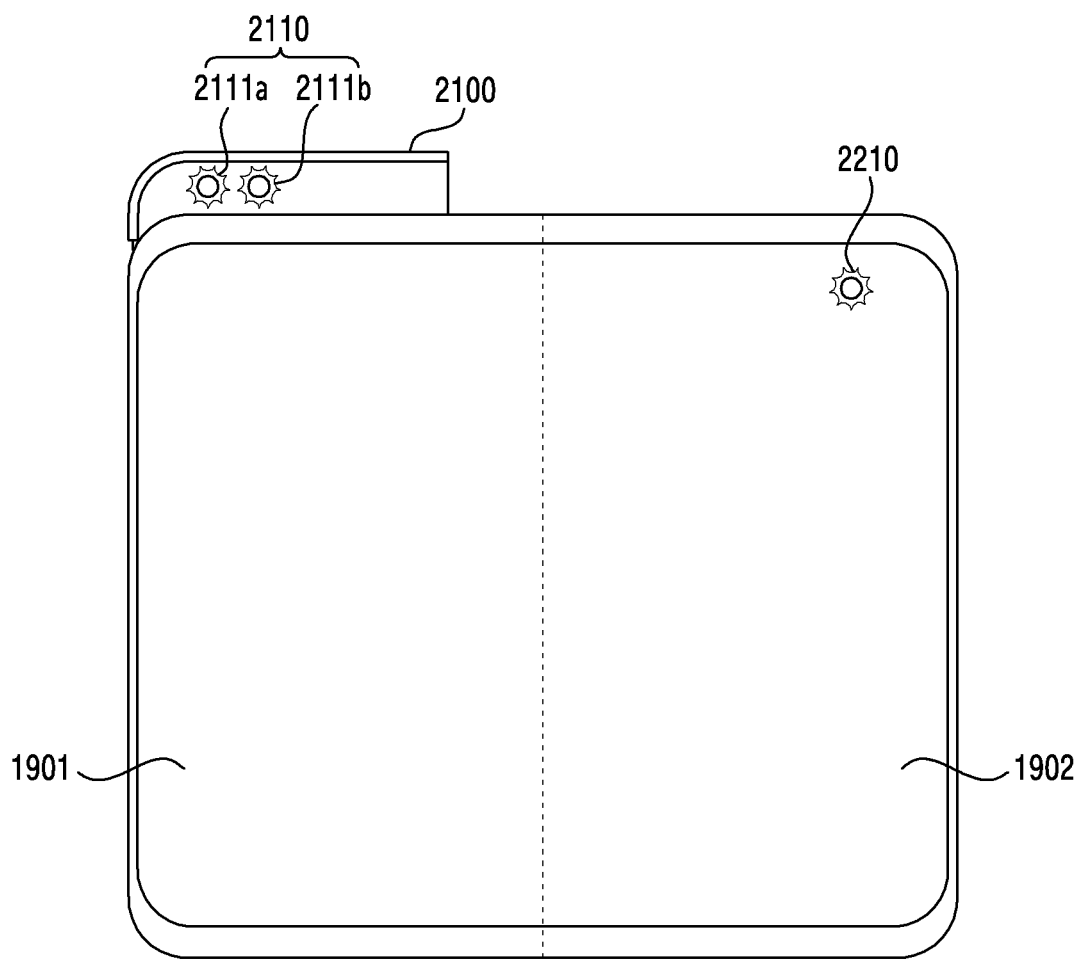
FIG. 23A illustrates various operations of an electronic device according to certain embodiments.
Figure 23B:
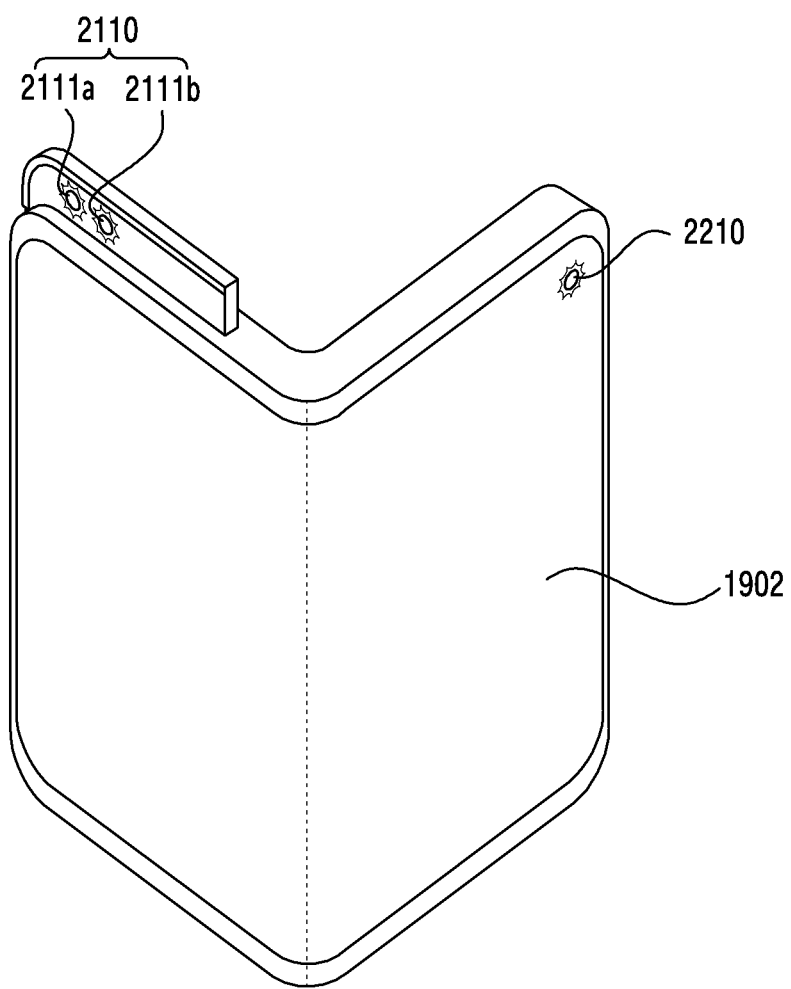
FIG. 23B illustrates various operations of an electronic device according to certain embodiments.
Figure 23C:
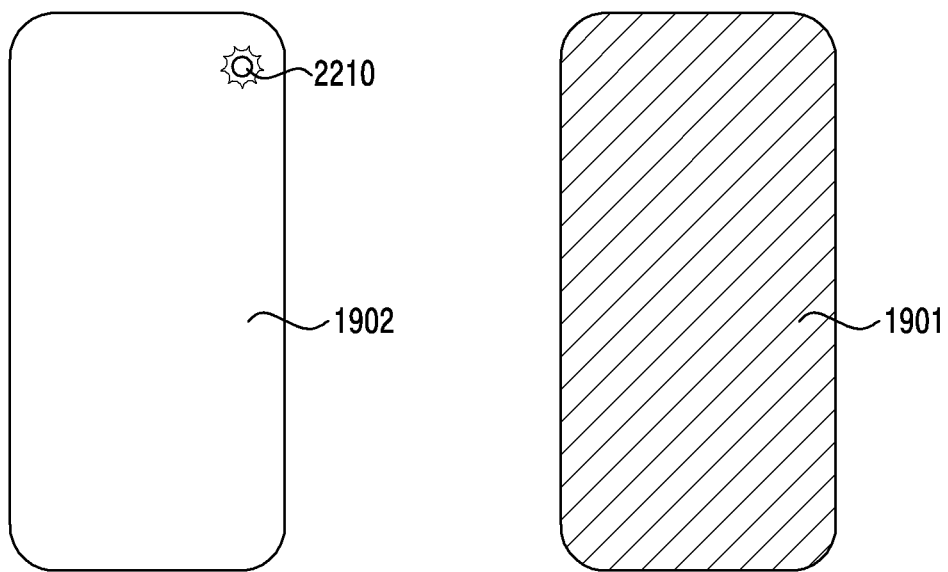
FIG. 23C illustrates various operations of an electronic device according to certain embodiments.
Figure 23D:
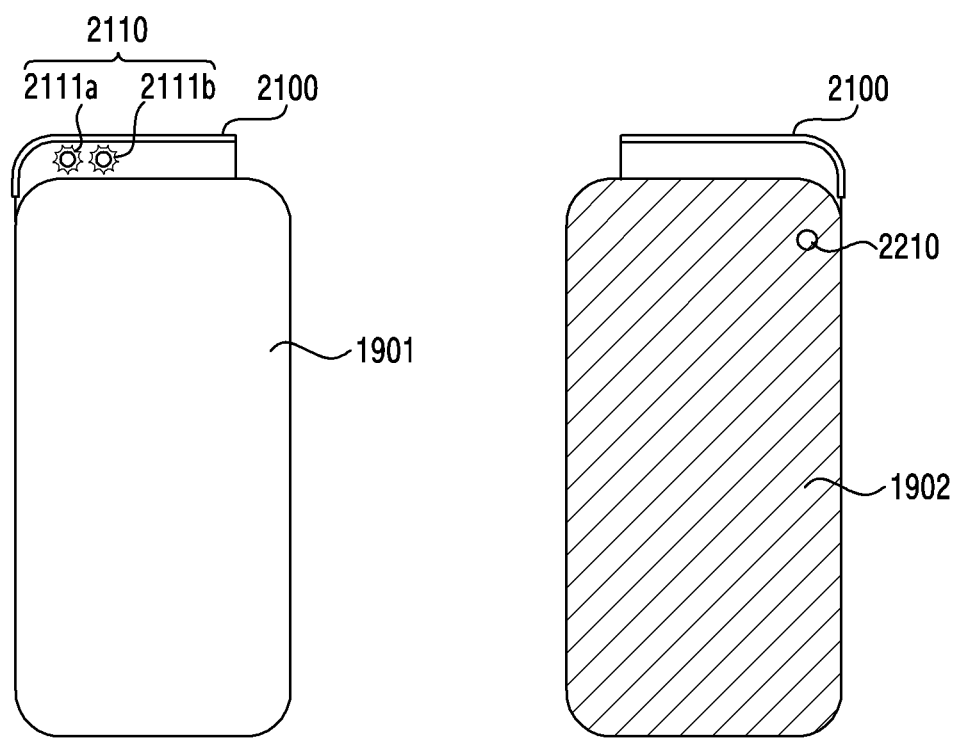
FIG. 23D illustrates various operations of an electronic device according to certain embodiments.

FIG. 22 is a block diagram illustrating an operation of an electronic device according to certain embodiments of the disclosure. FIG. 23A illustrates various operations of an electronic device according to certain embodiments, FIG. 23B illustrates various operations of an electronic device according to certain embodiments, FIG. 23C illustrates various operations of an electronic device according to certain embodiments; and FIG. 23D illustrates various operations of an electronic device according to certain embodiments.

Referring to FIGS. 22, 23A, 23B, 23C, and 23D, in operation 2201, the electronic device 2000 may execute a camera application in response to an input of the user. In operation 2203, the processor may identify the state of the display 1900 on the basis of the values acquired by using the first sensor 2001 and the second sensor 2002 in response to the execution of the camera application. According to certain embodiments, the first sensor 2001 may detect an angle value between the first display area 1901 and the second display area 1902 of the display 1900. The processor 120 may identify the state of the display 1900 in response to the angle detected by the first sensor 2001. For example, when the angle between the first area 1901 and the second area 1902 of the display 1900 is 180 degrees, the processor 120 may identify that the display 1900 is in an unfolding state. When the angle between the first area 1901 and the second area 1902 of the display 1900 is 0 degrees, the processor 120 may identify that the display 1900 is in a folding state. The processor 120 may identify whether the state of the display 1900 is changing or the display 1900 is held, by detecting a change of the angle between the first area 1901 and the second area 1902 when the angle is 0 to 180 degrees.

According to certain embodiments, the second sensor 2002 may be a motion sensor. The second sensor 2002 may be used to identify the display area of the electronic device used by the user. The second sensor 2002 may identify a surface that faces the user when the display 1900 is in a folding state. The second sensor 1900 may detect the gravitational direction, and the processor 120 may identify one of the first area 1901 or the second display area 1902, which is disposed in the gravitational direction, on the basis of the detected gravitational value.

According to certain embodiments, the third sensor 2003 may be a proximity sensor or a touch sensor. The third sensor 2003 may detect a signal in an area touched by the body of the user, and the processor 120 may identify a screen used by the user on the basis of the detected signal. For example, an area, in which a touch is input to the display 1900, may be activated, and the display 1900 may identify an area covered by the body (or a hand) of the user to deactivate the corresponding area.

According to certain embodiments, the processor 120 may identify the state of the display by using the first sensor 2001, the second sensor 2002, or the third sensor 2003 separately, or by combining the detected values.

According to certain embodiments, in operation 2205, the processor 120 may identify, among the first optical input/output device 2110 and the second optical input/output device 2210, at least one camera that needs to be activated, on the basis of the identified state.

Referring to FIGS. 23A and 23B, when the display is in the unfolding state or is converted from unfolding state to the folding state, all of the first camera 2111a and the second camera 2111b disposed in the first optical input/output device 2110 disposed in the sliding structure 2100 protruding from the first area 1901 and the camera of the second optical input/output device 2210 may be activated.

According to certain embodiments, the first optical input/output device 2110 and the second optical input/output device 2210 may be disposed on opposite sides of a long edge of the display 1900. The electronic device 2000 may acquire a maximum wide angle preview image in the unfolding state by using the first optical input/output device 2110 and the second optical input/output device 2210 disposed at remote sites.

According to certain embodiments, the angle between the first optical input/output device 2110 and the second optical input/output device 2210 is changed, the electronic device 2000 may acquire a panorama image of 360 degrees. For example, a plurality of images may be acquired while the first optical input/output device 2110 is folded into a folding state, and the electronic device 2000 may acquire a panorama image by combining the acquired images.

Referring to FIGS. 23C and 23D, the electronic device 2000 may be disposed in the folding state. If it is detected by the second sensor 2002 that an area that faces the user is the second display area 1902 as in FIG. 23C in the folding state, the electronic device 2000 may activate the second optical input/output device 2210 disposed in the second display area 1902. According to certain embodiments, although it is illustrated that the sliding structure is not exposed when the second display area 1902 is an area that faces the user, the sliding structure 2100 may be exposed and the first optical input/output device 2110 may be in an inactive state.

According to certain embodiments, if it is detected by the second sensor 2002 that an area that faces the user is the first display area 1901 as in FIG. 23D, the electronic device 2000 may activate the first optical input/output device 2110 disposed in the sliding structure 2100 protruding to the outside of the first display area 1902.

In operation 2207, the electronic device may identify a display area for a preview image on the basis of the identified state, and thereafter, in operation 2209, the electronic device may display a preview image on a display area identified on the basis of at least some of the images acquired by using the identified at least one optical input device (e.g., a camera or a camera module). Referring to FIGS. 23A and 23B, when the display is in an unfolding state or is converted from an unfolding state to a folding state, the electronic device 2000 may activate both the first area 1901 and the second area 1902. For example, in the electronic device 2000, the entire area of the display 1900 may be activated.

According to certain embodiments, if the display is in an unfolding state, the entire display area may be identified as an area that displays a preview image. The first optical input/output device 2110 and the second optical input/output device 2210 may be disposed on opposite sides of a long edge of the display 1900. The electronic device 2000 may acquire a maximum wide angle preview image in the unfolding state by using the first optical input/output device 2110 and the second optical input/output device 2210 disposed at remove sites. The electronic device 2000 may display a maximum wide angle preview image in the entire display area.

According to certain embodiments, the angle between the first optical input/output device 2110 and the second optical input/output device 2210 is changed, the electronic device 2000 may acquire a panorama image of 360 degrees. For example, a plurality of images may be acquired while the first optical input/output device 2110 is folded into a folding state, and the electronic device 2000 may acquire a panorama image by combining the acquired images. The electronic device 2000 may display a panorama preview image in a display area attached to a fixed housing.

According to certain embodiments the state of the electronic device 2000 may be converted from the unfolding state to the folding state. When the electronic device 2000 is folded within a specific angle, the processor may activate only one of the first display area 1901 or the second display area 1902.

Referring to FIGS. 23C and 23D, the electronic device 2000 may be disposed in the folding state. If it is detected by the second sensor 2002 that an area that faces the user is the second display area 1902 as in FIG. 23C in the folding state, the electronic device 2000 may display the preview image acquired through the second optical input/output device 2210 in the second display area 1902. If it is detected by the second sensor 2002 that an area that faces the user is the first display area 1901 as in FIG. 23D, the electronic device 2000 may display the preview image acquired through the first optical input/output device 2110 in the first display area 1901.

According to certain embodiments, the electronic device 2000 may activate only a display area that faces the user. For example, if the area that faces the user is the first display area, the electronic device 2000 may activate the first display area 1901. If the area that faces the user is the second display area, the electronic device 2000 may activate the second display area 1902.

An electronic device (e.g., the electronic device 10 of FIG. 5A) according to above-mentioned embodiments may include a foldable housing (e.g., the foldable housing 500 of FIG. 5A) including a hinge structure (e.g., the hinge structure 535 of FIG. 4), and a first housing structure (e.g., the first housing structure 510 of FIG. 5B) including a first surface connected to the hinge structure and facing a first direction and a second surface facing a second direction that is opposite to the first direction, and a second housing structure (e.g., the second housing structure 520 of FIG. 5B) connected to the hinge structure and including a third surface facing a third direction and a fourth surface facing a fourth direction that is opposite to the third direction, and folded with the first housing structure while the hinge structure is taken as an axis, a first display (e.g., the display 200 of FIG. 5A) extending from the first surface to the third surface and defining the first surface and the third surface, and a structure (e.g., the sliding structure 700 of FIG. 6B) configured to slide between a space in the second housing structure and the outside of the housing to move between a first periphery of the third surface and a second periphery of the fourth surface, the structure including at least one camera (e.g., the first optical input/output device 710) facing at least one of a third direction or a fourth direction.

According to certain embodiments, the electronic device may further include a second display (e.g., the second display 290 of FIG. 5B) viewed through at least a portion of the second surface, and the at least one camera may face the third direction.

According to certain embodiments, the electronic device may further include a processor (e.g., the processor 120 of FIG. 1) disposed in the first housing structure or the second housing structure and operatively connected to the first display and the structure, and a memory (e.g., the memory 130 of FIG. 1) operatively connected to the processor, and the memory may store instructions that, when executed, cause the processor to receive an input for executing the at least one camera, and allow the structure to protrude to the outside of the foldable housing at least partially on the basis of the input.

According to certain embodiments, the instructions may cause the processor to activate the camera in response to movement of the structure.

According to certain embodiments, the instructions may cause the processor to, if the least one application is ended, move the structure into the housing and also deactivate the camera.

According to certain embodiments, an electronic device may include a foldable housing (e.g., the foldable housing 500 of FIG. 5A) including a first surface and facing a first direction in an unfolding state, a second surface facing a second direction that is opposite to the first direction, and a side surface disposed between the first surface and the second surface, the foldable housing including a hinge structure configured to convert the state of the foldable housing to a folding or unfolding state, a first housing structure (e.g., the first housing structure 510 of FIG. 5A) connected to the hinge structure, and including a first side member at least partially surrounding a space between the first surface and the second surface, and a second housing structure (e.g., the second housing structure 520 of FIG. 5A) connected to the hinge structure, and including a second side member at least partially surrounding the remaining space between the first surface and the second surface, and folded with the first housing structure about the hinge structure, the first surface of the first housing structure may face the first surface of the second housing structure in the folding state, a first display (e.g., the first display 200 of FIG. 5A) disposed at least one surface of the foldable housing, being present over the first housing structure and the second housing structure, and capable of being bent about a hinge axis of the hinge structure, and a sliding structure (e.g., the sliding structure 700 of FIG. 6B) configured to move to protrude from a portion of the side surface of the foldable housing to the outside, and the sliding structure may include at least one first optical input module (e.g., the optical input/output device 710 of FIG. 6B) disposed in a direction, which the surface on which the first display is formed, in the folding state of the foldable housing.

According to certain embodiments, the electronic device may further include a second display (e.g., the second display 290 of FIG. 5*b*) disposed on the second surface of one of the first housing structure or the second housing structure, and the first display may be disposed on the first surface.

According to certain embodiments, in the electronic device, the first optical input module may face the first surface of the foldable housing in the unfolding state, and may face a surface of the foldable housing, on which the second display is disposed, in the folding state.

According to certain embodiments, the first optical input module may include at least one camera (e.g., the camera 711 of FIG. 6B) or at least one sensor (e.g., the sensor 712 of FIG. 6B).

According to certain embodiments, the first housing structure or the second housing structure, in which the sling module is disposed, may further include a second optical module (e.g., the second optical input/output device 900 of FIG. 9) on the second surface.

According to certain embodiments, the sliding structure may include a sensor module disposed in a direction that is opposite to the direction, which the first optical module faces, and the sensor module may include at least one of a heart rate sensor, an illumination sensor, or a flash.

According to certain embodiments, the first display may be disposed on the second surface of the foldable housing, and the display may include at least one hole, through which light passes.

According to certain embodiments, the electronic device may further include at least one camera (e.g., the third optical input/output device 1492 of FIG. 14A) disposed on the second surface of the foldable housing to correspond to the at least one hole.

According to certain embodiments, the electronic device may further include a driver configured to linearly reciprocate the sliding structure.

According to certain embodiments, in the electronic device may further include a first sensor (e.g., the first sensor 1730 of FIG. 17) configured to detect a folding state of the foldable housing, a processor (e.g., the processor 120 of FIG. 1) electrically connected to the first sensor and the driver, and a memory (e.g., the memory 130 of FIG. 1) operatively connected to the processor.

According to certain embodiments, the processor may be configured to execute at least one application, detect the folding state of the foldable housing through the first sensor, allow the sliding structure to protrude to the outside of the foldable housing by driving the driver in response to the detected folding state of the foldable housing and the application, and activate the first optical module.

According to certain embodiments, the memory may store instructions that, when executed, cause the processor to execute at least one application, detect the folding state of the foldable housing through the first sensor, and allow the sliding structure to protrude to the outside of the housing by driving the driver in response to the detected folding state of the housing and the application.

According to certain embodiments, the instructions may cause the processor to activate the first optical module in response to driving of the driver.

According to certain embodiments, the instructions may cause the processor to if the application is ended, move the sliding structure into the housing by driving the driver and also deactivate the first optical module.

According to certain embodiments, if the application is ended, the processor may allow the sliding structure to move into the housing by driving the driver and also deactivate the first optical module in response to ending of the application.

According to certain embodiments, a method for controlling an electronic device including a flexible display (e.g., the display 200 of FIG. 5A) and a sliding structure (e.g., the sliding structure 710 of FIG. 6B), on which a camera is mounted may include executing at least one application, detecting a folding state of the flexible display through at least one sensor, moving the camera of the sliding structure such that the camera is exposed to the outside of the electronic device in response to the detected folding state and the at least one application, activating the camera, and if it is determined through the at least one sensor that the folding state of the flexible display is within a specific angle, moving the sliding structure into the housing and deactivating the camera.

Methods disclosed in the claims and/or methods according to certain embodiments described in the specification of the disclosure may be implemented by hardware, software, or a combination of hardware and software.

According to certain embodiments, an electronic device comprises a first housing structure; and a second housing structure hingedly connected to the first housing structure along a hinge axis wherein a first surface of the first housing structure faces a first surface of the second housing structure in a folded configuration of the electronic device, and the first surface of the first housing structure and the first surface of the second housing structure are planar in an unfolded configuration of the electronic device; a first display disposed on the first surface of the first housing structure and the first surface of the second housing structure, and bendable about the hinge axis; and a sliding structure retractably disposed in the first housing structure, configured to protrude to the outside of the first housing structure in a direction substantially co-planar to the first surface of the first housing structure, the sliding structure comprising at least one optical input module facing a direction substantially orthogonal to the first surface.

According to certain embodiments, a second display is disposed on a second surface of one of the first housing structure or the second housing structure, the second surface of the one of the first housing structure or the second housing structure being substantially opposite to the first surface of the one of the one of the first housing structure or the second housing structure.

According to certain embodiments, the at least one optical input module faces the first surface of the second housing when the electronic device is in the folded configuration.

According to certain embodiments, the at least one optical input module comprises at least one camera or at least one sensor.

According to certain embodiments, the first housing structure further comprises a second optical module on a second surface of the first housing structure opposite the first surface of the first housing structure.

According to certain embodiments, the sliding structure comprises a sensor module disposed in a direction that is opposite to the direction, which the at least one optical module faces, and the sensor module comprises at least one of a heart rate sensor, an illumination sensor, or a flash.

According to certain embodiments, the first display is disposed on a second surface opposite the first surface of the first housing or the first surface of the second housing, and the display comprises at least one hole, through which light passes.

According to certain embodiments, at least one camera disposed on the second surface of the first housing to correspond to the at least one hole.

According to certain embodiments, a driver configured to linearly reciprocate the sliding structure.

According to certain embodiments, a first sensor configured to detect whether the electronic device is in the unfolded configuration or the folded configuration; at least one processor electrically connected to the first sensor and the driver; and a memory operatively connected to the processor.

According to certain embodiments, the memory stores instructions that, when executed, cause the at least one processor to: execute at least one application; detect the folded configuration or the unfolded configuration through the first sensor; and drive the driver causing the sliding structure to protrude to the outside of the housing in response to the detected folded configuration or the unfolded configuration g and the at least one application.

According to certain embodiments, the execution of the instructions cause the at least one processor to: activate the at least one optical module in response to driving of the driver.

According to certain embodiments, the execution of the instructions cause the at least one processor to: based on the end of application, move the sliding structure into the housing by driving the driver and also deactivate the at least one optical module.

According to certain embodiments, a method for controlling an electronic device comprising a flexible display and a sliding structure having a camera module disposed thereon, comprises executing at least one application; detecting a folding state of the flexible display through at least one sensor; and moving and activating the camera of the sliding structure such that the camera is exposed to the outside of the electronic device in response to the detected folding state and the at least one application.

According to certain embodiments, based on the end of the at least one application, the sliding structure is moved into the interior of the housing and the first optical module is deactivated.

According to certain embodiments, an electronic device comprises: a foldable housing comprising: a first housing structure comprising a first surface facing a first direction and a second surface facing a second direction that is opposite to the first direction; and a second housing structure hingedly connected to the second housing structure, comprising a third surface facing a third direction and a fourth surface facing a fourth direction that is opposite to the third direction; a first display disposed on the first surface and the third surface; and a structure configured to slide between a space in the second housing structure and the outside of the foldable housing to move between a first periphery of the third surface and a second periphery of the fourth surface, the structure comprising: at least one camera facing at least one of the third direction or the fourth direction.

According to certain embodiments, the electronic device further comprises a second display viewed through at least a portion of the second surface, wherein the at least one camera faces the third direction.

According to certain embodiments, at least one processor is disposed in the first housing structure or the second housing structure and operatively connected to the first display and the structure; and a memory is operatively connected to the at least one processor, wherein the memory stores instructions that, when executed, cause the at least one processor to: receive an input for executing the at least one camera; and cause the structure to protrude to the outside of the foldable housing at least partially on the basis of the input.

According to certain embodiments, the instructions cause the at least one processor to: activate the camera in response to movement of the structure.

According to certain embodiments, the instructions cause the at least one processor to: based on the end of the at least one application, move the structure into a space in the second housing structure and also deactivate the camera.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to certain embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
   a first housing structure; and
   a second housing structure hingedly connected to the first housing structure along a hinge axis
   wherein a first surface of the first housing structure faces a first surface of the second housing structure in a folded configuration of the electronic device, and the first surface of the first housing structure and the first surface of the second housing structure are planar in an unfolded configuration of the electronic device;
   a first display disposed on the first surface of the first housing structure and the first surface of the second housing structure, and bendable about the hinge axis;
   at least one camera disposed on a second surface of the first housing structure opposite to the first surface of the first structure; and
   a sliding structure retractably disposed in the first housing structure, configured to protrude to the outside of the first housing structure in a direction substantially coplanar to the first surface of the first housing structure, the sliding structure comprising at least one optical input module facing a direction substantially orthogonal to the first surface and at least one sensor module disposed in a direction that is opposite to the direction, which the at least one optical input module faces,
   wherein the at least one sensor module includes at least one sensor which assist utilization of the at least one optical input module.

2. The electronic device of claim 1, further comprising:
   a second display disposed on a second surface of one of the first housing structure or the second housing structure, the second surface of the one of the first housing structure or the second housing structure being substantially opposite to the first surface of the one of the one of the first housing structure or the second housing structure.

3. The electronic device of claim 2, wherein the at least one optical input module faces the first surface of the second housing structure when the electronic device is in the folded configuration.

4. The electronic device of claim 3, wherein the at least one optical input module comprises at least one camera or at least one sensor.

5. The electronic device of claim 3, wherein the first housing structure further comprises a second optical module on a second surface of the first housing structure opposite the first surface of the first housing structure.

6. The electronic device of claim 5, wherein the sensor module comprises at least one of a heart rate sensor, an illumination sensor, or a flash.

7. The electronic device of claim 1, wherein the first display is disposed on the first surface opposite a second surface of the first housing structure, and the display comprises at least one hole, through which light passes.

8. The electronic device of claim 7,
wherein the at least one camera disposed on the second surface of the first housing structure to correspond to the at least one hole.

9. The electronic device of claim 1, further comprising:
a driver configured to linearly reciprocate the sliding structure.

10. The electronic device of claim 9, further comprising:
a first sensor configured to detect whether the electronic device is in the unfolded configuration or the folded configuration;
at least one processor electrically connected to the first sensor and the driver; and
a memory operatively connected to the processor.

11. The electronic device of claim 10, wherein the memory stores instructions that, when executed, cause the at least one processor to:
execute at least one application;
detect the folded configuration or the unfolded configuration through the first sensor; and
drive the driver causing the sliding structure to protrude to the outside of the first housing structure in response to the detected folded configuration or the unfolded configuration and the at least one application.

12. The electronic device of claim 11, wherein the execution of the instructions cause the at least one processor to:
activate the at least one optical input module in response to driving of the driver.

13. The electronic device of claim 11, wherein the execution of the instructions cause the at least one processor to:
based on the end of the at least one application, move the sliding structure into the housing by driving the driver and also deactivate the at least one optical input module.

14. A method for controlling an electronic device comprising a flexible display, a first camera module and a sliding structure having a second camera module and at least one sensor disposed thereon, the method comprising:
executing at least one application;
detecting a folding state of the flexible display through the at least one sensor; and
moving and activating the camera module of the sliding structure such that the camera is exposed to the outside of the electronic device in response to the detected folding state and the at least one application,
wherein the first camera module is disposed on a housing structure that the flexible display is disposed,
wherein the sliding structure is retractably disposed in the housing structure, configured to protrude to the outside of the housing structure, and
wherein the at least one sensor assist utilization of the first camera module.

15. The method of claim 14, wherein based on an end of the at least one application, the sliding structure is moved into the interior of the electronic device and the second camera module is deactivated.

16. An electronic device comprising:
a foldable housing comprising:
a first housing structure comprising a first surface facing a first direction and a second surface facing a second direction that is opposite to the first direction, and
a second housing structure hingedly connected to the first housing structure, comprising a third surface facing a third direction and a fourth surface facing a fourth direction that is opposite to the third direction;
a first display disposed on the first surface and the third surface;
at least one first camera disposed on the second surface of the first housing structure; and
a sliding structure configured to slide between a space in the second housing structure and the outside of the foldable housing to move between a first periphery of the third surface and a second periphery of the fourth surface, and disposed in a longitudinal direction from one end of the first housing structure to the other end of the first housing, the sliding structure comprising: at least one second camera facing at least one of the third direction or the fourth direction, and at least one sensor module disposed in a direction that is opposite to the direction, which the at least one first camera faces,
wherein the at least one sensor module includes at least one sensor which assist utilization of the at least one first camera.

17. The electronic device of claim 16, further comprising:
a second display viewed through at least a portion of the second surface,
wherein the at least one second camera faces the third direction.

18. The electronic device of claim 16, further comprising:
at least one processor disposed in the first housing structure or the second housing structure and operatively connected to the first display and the sliding structure; and
a memory operatively connected to the at least one processor,
wherein the memory stores instructions that, when executed, cause the at least one processor to:
receive an input for executing the at least one camera; and
cause the sliding structure to protrude to the outside of the foldable housing at least partially on the basis of the input.

19. The electronic device of claim 18, wherein the instructions cause the at least one processor to:
activate the camera in response to movement of the structure.

20. The electronic device of claim 18, wherein the instructions cause the at least one processor to:
execute at least one application;
moving and activating the at least one second camera of the sliding structure such that the at least one second camera is exposed to the outside of the electronic device; and based on the end of the at least one application executed, move the structure into a space in the second housing structure and also deactivate the camera.

\* \* \* \* \*